United States Patent
Gao et al.

(10) Patent No.: US 10,652,635 B2
(45) Date of Patent: May 12, 2020

(54) PASSIVE OPTICAL NETWORK COMMUNICATIONS METHOD AND APPARATUS, AND SYSTEM

(71) Applicant: Huawei Technologies Co., Ltd., Shenzhen, Guangdong (CN)

(72) Inventors: Jianhe Gao, Wuhan (CN); Minghui Tao, Wuhan (CN); Zhicheng Ye, Wuhan (CN); Shengmeng Fu, Wuhan (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/914,655

(22) Filed: Mar. 7, 2018

(65) Prior Publication Data
US 2018/0199119 A1 Jul. 12, 2018

Related U.S. Application Data

(63) Continuation of application No. PCT/CN2015/089062, filed on Sep. 7, 2015.

(51) Int. Cl.
*H04L 12/14* (2006.01)
*H04Q 11/00* (2006.01)
(Continued)

(52) U.S. Cl.
CPC ........ *H04Q 11/0067* (2013.01); *H04J 3/1694* (2013.01); *H04J 14/0226* (2013.01);
(Continued)

(58) Field of Classification Search
CPC .. H04J 3/1694; H04J 14/0226; H04J 14/0232; H04J 14/0246
See application file for complete search history.

(56) References Cited

U.S. PATENT DOCUMENTS 6,411,410 B1* 6/2002 Wright ................ H04B 10/272
398/79
9,438,368 B2* 9/2016 Gao .................... H04J 14/0246
(Continued)

FOREIGN PATENT DOCUMENTS

CN 101453671 A 6/2009
CN 103378918 A 10/2013
(Continued)

OTHER PUBLICATIONS

Sivakumar et al.; "Performance analysis of ONU-wavelength grouping schemes for efficient scheduling in long reach-PONs"; Optical Switching and Networking; vol. 10, Issue 4; Mar. 2013; 10 pages.
(Continued)

*Primary Examiner* — Abdelnabi O Musa
(74) *Attorney, Agent, or Firm* — Womble Bond Dickinson (US) LLP

(57) ABSTRACT

Embodiments of the present disclosure provide a passive optical network communications method and apparatus, and a system. The method includes: determining a wavelength channel group of an optical network unit (ONU) and a wavelength channel in the wavelength channel group; and sending a first message to the ONU, where the first message carries identification information of the wavelength channel group and identification information of the wavelength channel in the wavelength channel group. In the embodiments of the present disclosure, such a logical channel group as a wavelength channel group is established, and when a channel in a channel group is faulty, a scheduling module of an OLT can rapidly and easily reallocate a service to another member in the channel group, so that channel interaction is avoided. Therefore, bandwidth scheduling efficiency and bandwidth utilization of a PON system are higher.

20 Claims, 10 Drawing Sheets

(51) Int. Cl.
*H04J 3/16* (2006.01)
*H04J 14/02* (2006.01)

(52) U.S. Cl.
CPC ...... *H04J 14/0232* (2013.01); *H04J 14/0246* (2013.01); *H04Q 11/0071* (2013.01)

(56) References Cited

U.S. PATENT DOCUMENTS

| | | | | |
|---|---|---|---|---|
| 10,455,302 | B2* | 10/2019 | Zhang | H04Q 11/0067 |
| 2006/0222364 | A1* | 10/2006 | Chung | H04B 10/0771 |
| | | | | 398/72 |
| 2008/0031623 | A1 | 2/2008 | Bardalai et al. | |
| 2010/0158527 | A1* | 6/2010 | Mizutani | H04B 1/707 |
| | | | | 398/78 |
| 2011/0085795 | A1 | 4/2011 | Ozaki | |
| 2013/0094862 | A1 | 4/2013 | Luo et al. | |
| 2013/0315589 | A1* | 11/2013 | Gao | H04Q 11/0005 |
| | | | | 398/48 |
| 2015/0207585 | A1* | 7/2015 | Luo | H04J 14/0256 |
| | | | | 398/72 |
| 2015/0365192 | A1* | 12/2015 | Kim | H04J 14/0256 |
| | | | | 398/66 |
| 2017/0033863 | A1* | 2/2017 | Zhou | H04B 10/071 |
| 2017/0207876 | A1 | 7/2017 | Gao et al. | |
| 2017/0303020 | A1* | 10/2017 | Ye | H04J 14/02 |

FOREIGN PATENT DOCUMENTS

| | | |
|---|---|---|
| CN | 103428586 A | 12/2013 |
| CN | 103841474 A | 6/2014 |
| CN | 104837079 A | 8/2015 |
| EP | 2533448 A2 | 12/2012 |
| JP | 2011082908 A | 4/2011 |
| JP | 2014515221 A | 6/2014 |
| KR | 20050066047 A | 6/2005 |
| WO | 2012089519 A1 | 7/2012 |
| WO | 2013185306 A1 | 12/2013 |

OTHER PUBLICATIONS

IEEE 802.3 Ethernet Working Group; "Industry Connections Feasibility Assessment for the Next Generation of EPON"; Mar. 13, 2015; 103 pages.

* cited by examiner

PASSIVE OPTICAL NETWORK COMMUNICATIONS METHOD AND APPARATUS, AND SYSTEM

CROSS-REFERENCE TO RELATED APPLICATION

This application is a continuation of International Patent Application No. PCT/CN2015/089062 filed on Sep. 7, 2015, the disclosure of which is hereby incorporated by reference in its entirety.

TECHNICAL FIELD

Embodiments of the present application relate to optical communications technologies, and in particular, to a passive optical network communications method and apparatus, and a system.

BACKGROUND

As optical communications technologies rapidly develop, a passive optical network (PON) system is more widely applied in the optical communications technologies. The PON system may include a time division multiplexing (TDM) PON, a gigabit passive optical network (GPON), 10G-GPON, an Ethernet passive optical network (EPON), a 10G-EPON, a time wavelength division multiplexing (TWDM) PON, a point-to-point (PtP) PON, a wavelength division multiplexing (WDM) PON, and the like.

As shown in FIG. 1, for each type of PON system, the PON system may include: an optical line terminal (OLT) located at a central office, an optical distribution network (ODN) including a passive optical device, and an optical network unit (ONU)/optical network terminal (ONT) at a user end. The ONU may be used to represent the ONU and/or the ONT.

In a general PON, an ONU has only one wavelength channel (one wavelength channel includes one downstream wavelength and one upstream wavelength). In this case, a maximum bandwidth of the ONU is only 10 Gbps. A bandwidth provided by an existing PON cannot meet a high-bandwidth requirement of a user. Therefore, how to provide a high bandwidth and implement service sharing is an urgent technical problem to be resolved.

SUMMARY

Embodiments of the present disclosure provide a passive optical network communications method and apparatus, and a system, so as to enable an ONU to work better on at least one wavelength channel when a bandwidth of the ONU is required to be greater than 10G in the industry.

A first aspect provides a passive optical network communication method, including: determining a wavelength channel group of an optical network unit ONU and a wavelength channel in the wavelength channel group; and sending a first message to the ONU, where the first message is used to instruct the ONU to establish the wavelength channel group, and the first message carries identification information of the wavelength channel group and identification information of the wavelength channel in the wavelength channel group.

With reference to the first aspect, in a first possible implementation of the first aspect, before the determining a wavelength channel group of an optical network unit ONU and a wavelength channel in the wavelength channel group, the method further includes: sending a second message to the ONU, where the second message is used to request the ONU to report an identifier of the wavelength channel.

With reference to the first aspect or the first possible implementation of the first aspect, in a second possible implementation of the first aspect, the method further includes: receiving a third message from the ONU, where the third message carries the identifier of the wavelength channel reported by the ONU.

With reference to the first aspect or any possible implementation of the first aspect, in a third possible implementation of the first aspect, the method further includes: locally establishing, by an OLT, a wavelength channel group mapping table, so as to store a mapping relationship between the wavelength channel group of the ONU and the wavelength channel in the wavelength channel group.

With reference to the first aspect or any possible implementation of the first aspect, in a fourth possible implementation of the first aspect, the method further includes: sending a fourth message to the ONU, where the fourth message is used to instruct the ONU to update information about the wavelength channel group.

With reference to the first aspect or any possible implementation of the first aspect, in a fifth possible implementation of the first aspect, the first message further carries an identifier of the ONU.

With reference to the first aspect or any possible implementation of the first aspect, in a sixth possible implementation of the first aspect, the identification information of the wavelength channel is a wavelength channel number of the ONU, upstream wavelength information of the ONU, downstream wavelength information of the ONU, or upstream and downstream wavelength information of the ONU.

With reference to any one of the first aspect or the first to the sixth possible implementations of the first aspect, in a seventh possible implementation of the first aspect, the first message, the second message, the third message, or the fourth message is a Multi-Point Control Protocol MPCP message.

With reference to any one of the first aspect or the first to the sixth possible implementations of the first aspect, in an eighth possible implementation of the first aspect, the first message, the second message, the third message, or the fourth message is a physical layer operation, administration and maintenance PLOAM message.

With reference to any one of the first aspect or the first to the sixth possible implementations of the first aspect, in a ninth possible implementation of the first aspect, the first message, the second message, the third message, or the fourth message is an operation, administration and maintenance OAM message.

With reference to any one of the first aspect or the first to the sixth possible implementations of the first aspect, in a tenth possible implementation of the first aspect, the first message, the second message, the third message, or the fourth message is an optical network terminal management and control interface OMCI message.

A second aspect provides a passive optical network PON communications apparatus, including: a processing unit, configured to determine a wavelength channel group of an optical network unit ONU and a wavelength channel in the wavelength channel group; and a sending unit, configured to send a first message to the ONU, where the first message is used to instruct the ONU to establish the wavelength channel group, and the first message carries identification information of the wavelength channel group and identification information of the wavelength channel in the wavelength channel group.

With reference to the second aspect, in a first possible implementation of the second aspect, the sending unit is further configured to send a second message to the ONU, where the second message is used to request the ONU to report an identifier of the wavelength channel.

With reference to the second aspect or the first possible implementation of the second aspect, in a second possible implementation of the second aspect, the apparatus further includes a receiving unit, configured to receive a third message from the ONU, where the third message carries the identifier of the wavelength channel of the ONU.

With reference to the second aspect or any possible implementation of the second aspect, in a third possible implementation of the second aspect, the processing unit is further configured to establish a wavelength channel group mapping table, so as to store a mapping relationship between the wavelength channel group of the ONU and the wavelength channel in the wavelength channel group.

With reference to the second aspect or any possible implementation of the second aspect, in a fourth possible implementation of the second aspect, the sending unit is further configured to send a wavelength channel group update message to the ONU, so as to instruct the ONU to update the wavelength channel group.

With reference to the second aspect or any possible implementation of the second aspect, in a fifth possible implementation of the second aspect, the first message further carries an identifier of the ONU.

With reference to the second aspect or any possible implementation of the second aspect, in a sixth possible implementation of the second aspect, the identifier of the wavelength channel is a wavelength channel number of the ONU, upstream wavelength information of the ONU, downstream wavelength information of the ONU, or upstream and downstream wavelength information of the ONU.

With reference to the second aspect or any possible implementation of the second aspect, in a seventh possible implementation of the second aspect, the first message is a Multi-Point Control Protocol MPCP message, an operation, administration and maintenance OAM message, a physical layer operation, administration and maintenance PLOAM message, or an optical network terminal management and control interface OMCI message.

A third aspect provides a passive optical network communication method, and the method includes: receiving a first message from an optical line terminal OLT, where the first message is used to instruct an optical network unit ONU to establish a wavelength channel group, and the first message carries an identifier of the wavelength channel group and an identifier of a wavelength channel in the wavelength channel group; and establishing the wavelength channel group according to the first message.

With reference to the third aspect, in a first possible implementation of the third aspect, the method further includes: receiving the first message sent by the optical line terminal OLT, where the first message is used to request the optical network unit ONU to report the identifier of the wavelength channel.

With reference to the third aspect or the first possible implementation of the third aspect, in a second possible implementation of the third aspect, the method further includes: sending the identifier of the wavelength channel of the ONU to the OLT.

With reference to the third aspect or any possible implementation of the third aspect, in a third possible implementation of the third aspect, the method further includes: establishing, by the ONU, a wavelength channel group mapping table, so as to store a mapping relationship between the wavelength channel group of the ONU and the wavelength channel.

With reference to the third aspect or any possible implementation of the third aspect, in a fourth possible implementation of the third aspect, the first message further carries an identifier of the ONU.

With reference to the third aspect or any possible implementation of the third aspect, in a fifth possible implementation of the third aspect, the identification information of the wavelength channel is a wavelength channel number of the ONU, upstream wavelength information of the ONU, downstream wavelength information of the ONU, or upstream and downstream wavelength information of the ONU.

With reference to the third aspect or any possible implementation of the third aspect, in a sixth possible implementation of the third aspect, the first message is a Multi-Point Control Protocol MPCP message, an operation, administration and maintenance OAM message, a physical layer operation, administration and maintenance PLOAM message, or an optical network terminal management and control interface OMCI message.

A fourth aspect provides a passive optical network PON communications apparatus, where the apparatus includes: a receiving unit, configured to receive a first message from the OLT, where the first message is used to instruct the ONU to establish a wavelength channel group, and the first message carries an identifier of the wavelength channel group and an identifier of a wavelength channel in the wavelength channel group; and a processing unit, configured to establish the wavelength channel group according to the first message.

With reference to the fourth aspect, in a first possible implementation of the fourth aspect, the receiving unit is further configured to receive a second message sent by the optical line terminal OLT, where the second message is used to request the optical network unit ONU to report the identifier of the wavelength channel.

With reference to the fourth aspect or the first possible implementation of the fourth aspect, in a second possible implementation of the fourth aspect, the apparatus further includes a sending unit, configured to send the identifier of the wavelength channel of the ONU to the OLT.

With reference to the fourth aspect or any possible implementation of the fourth aspect, in a third possible implementation of the fourth aspect, the processing unit is further configured to establish a wavelength channel group mapping table, so as to store information about a mapping relationship between a wavelength channel group and a wavelength channel.

With reference to the fourth aspect or any possible implementation of the fourth aspect, in a fourth possible implementation of the fourth aspect, the first message further carries an identifier of the ONU.

With reference to the fourth aspect or any possible implementation of the fourth aspect, in a fifth possible implementation of the fourth aspect, the identification information of the wavelength channel is a wavelength channel number of the ONU, upstream wavelength information of the ONU, downstream wavelength information of the ONU, or upstream and downstream wavelength information of the ONU.

With reference to the fourth aspect or any possible implementation of the fourth aspect, in a sixth possible implementation of the fourth aspect, the first message is a Multi-Point Control Protocol MPCP message, an operation, administration and maintenance OAM message, a physical layer operation, administration and maintenance PLOAM message, or an optical network terminal management and control interface OMCI message.

A fifth aspect provides a passive optical network PON system, where the system includes an optical line terminal OLT and at least one optical network unit ONU, the OLT is connected to the at least one ONU by using an optical distribution network ODN, the OLT is the apparatus according to any one of the second aspect or the first to the seventh possible implementations of the second aspect, and the ONU is the apparatus according to any one of the fourth aspect or the first to the sixth possible implementations of the fourth aspect.

In the embodiments of the present disclosure, such a logical channel group as a wavelength channel group is established, so that a high-bandwidth capability can be implemented. In addition, when a channel in a channel group is faulty, a scheduling module of the OLT can reallocate a service to another member in the channel group, so that channel interaction is avoided. Therefore, bandwidth scheduling efficiency and bandwidth utilization of a PON system are higher.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DETAILED DESCRIPTION

To make the objectives, technical solutions, and advantages of the embodiments of the present disclosure clearer, the following clearly and describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

To describe the technical solutions in the present disclosure more clearly, the following describes an existing TWDM-PON system architecture, and extends to a network architecture in the present disclosure.

Figure 1:
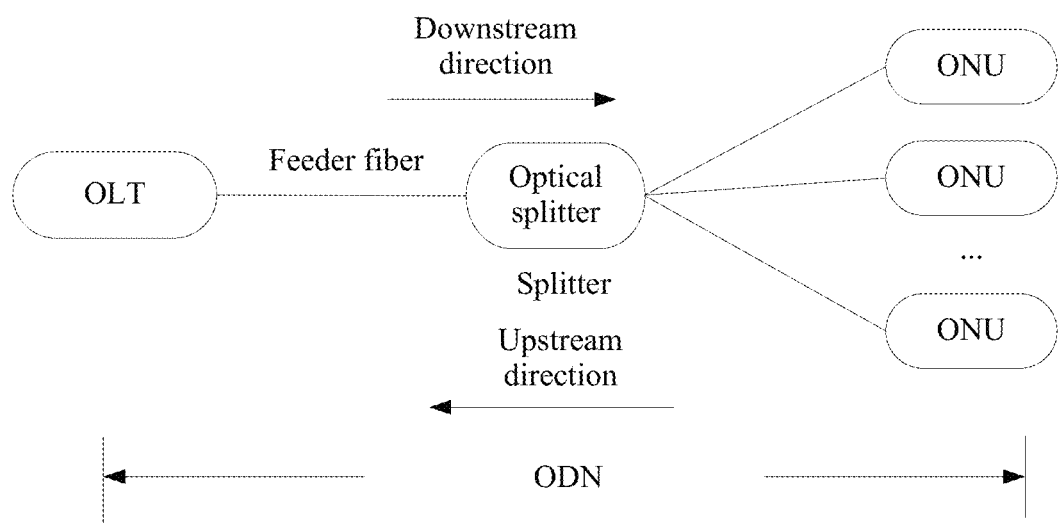
FIG. 1 is a schematic structural diagram of a PON network in the prior art.
Figure 2:
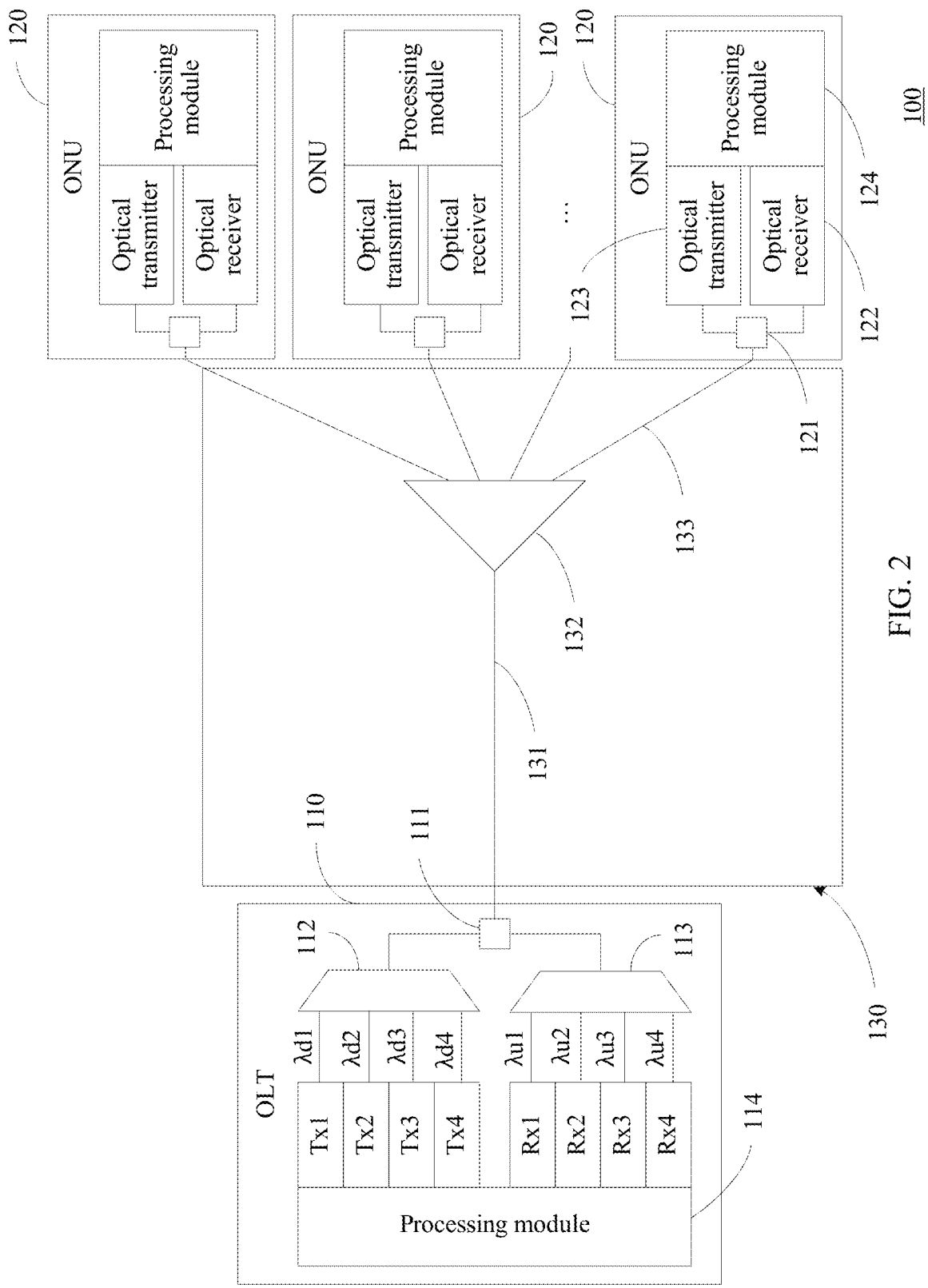
FIG. 2 is a schematic structural diagram of a TWDM-PON network according to an embodiment of the present disclosure.

FIG. 2 is a schematic diagram of a network architecture of a TWDM-PON system. As shown in FIG. 2, a TWDM-PON system 100 includes one OLT 100, a plurality of ONUs 120, and an optical distribution network (ODN) 130. The OLT 110 is connected to the plurality of ONUs 120 in a point-to-multipoint manner by using the ODN 130. The TWDM-PON system 100 may include at least one OLT. The plurality of ONUs 120 share an optical transmission medium of the ODN 130. The ODN 130 may include a feeder fiber 131, an optical power splitter module 132, and a plurality of distribution fibers 133. The optical power splitter module 132 may be disposed on a remote node (RN), is connected to the OLT 110 by using the feeder fiber 131, and is separately connected to the plurality of ONUs 120 by using the plurality of distribution fibers 133. In the TWDM-PON system 100, a communication link between the OLT 110 and the plurality of ONUs 120 may include a plurality of wavelength channels, and the optical transmission medium of the ODN 130 is shared by the plurality of wavelength channels in a WDM manner. Each ONU 120 may work on one of the plurality of wavelength channels of the TWDM-PON system 100, and each wavelength channel may carry services of one or more ONUs 120. In addition, ONUs 120 working on a same wavelength channel may share the wavelength channel in a TDM manner. In FIG. 2, an example in which the TWDM-PON system 100 includes four wavelength channels is used for description. It should be understood that in practical application, a quantity of wavelength channels of the TWDM-PON system 100 may be set according to a network requirement.

For ease of description, the four wavelength channels of the TWDM-PON system 100 in FIG. 2 are named as a wavelength channel 1, a wavelength channel 2, a wavelength channel 3, and a wavelength channel 4. Each wavelength channel uses a pair of upstream and downstream wavelengths. For example, an upstream wavelength and a downstream wavelength of the wavelength channel 1 may be $\lambda u1$ and $\lambda d1$, respectively, an upstream wavelength and a downstream wavelength of the wavelength channel 2 may be $\lambda u2$ and $\lambda d2$, respectively, an upstream wavelength and a downstream wavelength of the wavelength channel 3 may be $\lambda u3$ and $\lambda d3$, respectively, and an upstream wavelength and a downstream wavelength of the wavelength channel 4 may be λu4 and λd4, respectively. Each wavelength channel may have a corresponding wavelength channel identifier (for example, channel numbers of the four wavelength channels may be 1, 2, 3, and 4), that is, there is a matching relationship between a wavelength channel identifier and upstream and downstream wavelengths of a wavelength channel identified by the wavelength channel identifier. The OLT 110 and the ONU 120 may learn of an upstream wavelength and a downstream wavelength of a wavelength channel according to a wavelength channel identifier.

The OLT 110 may include an optical coupler 111, a first wavelength division multiplexer 112, a second wavelength division multiplexer 113, a plurality of downstream optical transmitters Tx1 to Tx4, a plurality of upstream optical receivers Rx1 to Rx4, and a processing module 114. The plurality of downstream optical transmitters Tx1 to Tx4 is connected to the optical coupler 111 by using the first wavelength division multiplexer 112, the plurality of upstream optical receivers Rx1 to Rx4 are connected to the optical coupler 111 by using the second wavelength division multiplexer 113, and the coupler 111 is further connected to the feeder fiber 131 of the ODN 130.

The plurality of downstream optical transmitters Tx1 to Tx4 have different transmit wavelengths, and each of the downstream optical transmitters Tx1 to Tx4 may correspond to one wavelength channel of the TWDM-PON system 100. For example, the transmit wavelengths of the plurality of downstream optical transmitters Tx1 to Tx4 may be λd1 to λd4. The downstream optical transmitters Tx1 to Tx4 may respectively transmit downstream data to corresponding wavelength channels by using the transmit wavelengths λd1 to λd4 of the downstream optical transmitters Tx1 to Tx4, so that ONUs 120 working on the corresponding wavelength channels receive the downstream data. Correspondingly, the plurality of upstream optical receivers Rx1 to Rx4 may have different receive wavelengths, and similarly, each of the upstream optical receivers Rx1 to Rx4 corresponds to one wavelength channel of the TWDM-PON system 100. For example, the receive wavelengths of the plurality of upstream optical receivers Rx1 to Rx4 may be λu1 to λu4. The upstream optical receivers Rx1 to Rx4 may respectively receive, by using the receive wavelengths λu1 to λu4 of the upstream optical receivers Rx1 to Rx4, upstream data sent by ONUs 120 working on corresponding wavelength channels.

The first wavelength division multiplexer 112 is configured to: perform wavelength division multiplexing processing on the downstream data that is transmitted by the plurality of downstream optical transmitters Tx1 to Tx4 and whose wavelengths are λd1 to λd4; and send the downstream data to the feeder fiber 131 of the ODN 130 by using the optical coupler 111, so as to provide the ONU 120 with the downstream data by using the ODN 130. In addition, the optical coupler 111 may be further configured to provide the second wavelength division multiplexer 113 with the upstream data that is from the plurality of ONUs 120 and whose wavelengths are λu1 to λu4, and the second wavelength division multiplexer 113 may demultiplex the upstream data whose wavelengths are λu1 to λu4 to the upstream optical receivers Rx1 to Rx4 for data receiving.

The processing module 114 may be a Media Access Control (MAC) module. The processing module 114 may designate working wavelength channels for the plurality of ONUs 120 by means of wavelength negotiation, and provide, according to a working wavelength channel of an ONU 120, the downstream optical transmitters Tx1 to Tx4 corresponding to wavelength channels with downstream data to be sent to the ONU 120, so that the downstream optical transmitters Tx1 to Tx4 transmit the downstream data to the corresponding wavelength channels. In addition, the processing module 114 may further perform upstream dynamic bandwidth allocation (DBA) on each wavelength channel, and allocate an upstream sending timeslot to ONUs 120 that are multiplexed to a same wavelength channel in a TDM manner, so as to authorize the ONU 120 to send upstream data in a specific timeslot by using a wavelength channel corresponding to the ONU 120.

An upstream transmit wavelength and a downstream receive wavelength of each ONU 120 are adjustable. The ONU 120 may separately adjust, according to a wavelength channel designated by the OLT 110, the upstream transmit wavelength and the downstream receive wavelength of the ONU 120 to an upstream wavelength and a downstream wavelength of the wavelength channel, so as to implement upstream and downstream data sending and receiving by using the wavelength channel. For example, if the OLT 110 instructs, in a wavelength negotiation process, an ONU 120 to work on the wavelength channel 1, the ONU 120 may separately adjust an upstream transmit wavelength and a downstream receive wavelength of the ONU 120 to a first upstream wavelength λu1 and a first downstream wavelength λd1. If the OLT 110 instructs an ONU 120 to work on the wavelength channel 3, the ONU 120 may separately adjust an upstream transmit wavelength and a downstream receive wavelength of the ONU 120 to a third upstream wavelength λu3 and a third downstream wavelength λd3.

The ONU 120 may include an optical coupler 121, a downstream optical receiver 122, an upstream optical transmitter 123, and a processing module 124. By using the optical coupler 121, the downstream optical receiver 122 and the upstream optical transmitter 123 are connected to a distribution fiber 133 corresponding to the ONU 120. The optical coupler 121 may provide the distribution fiber 133 of the ODN 130 with upstream data sent by the upstream optical transmitter 123, so as to send the upstream data to the OLT 110 by using the ODN 130. In addition, the optical coupler 121 may further provide the downstream optical receiver 122 with downstream data for data receiving, and the downstream data is sent by the OLT 110 by using the ODN 130.

The processing module 124 may be a MAC module. The processing module 124 may perform wavelength negotiation with the OLT 110, and adjust a receive wavelength of the downstream optical receiver 122 and a transmit wavelength of the upstream optical transmitter 123 according to a wavelength channel designated by the OLT 110 (that is, adjust a downstream receive wavelength and an upstream transmit wavelength of the ONU 120), so that the ONU 120 works on the wavelength channel designated by the OLT 110. In addition, the processing module 124 may further control, according to a dynamic bandwidth allocation result of the OLT 110, the upstream optical transmitter 123 to send upstream data in a designated timeslot.

When the TWDM-PON system 100 runs, if there are many online ONUs 120, some ONUs 120 may work on the wavelength channel 1, some ONUs 120 work on the wavelength channel 2, some ONUs 120 work on the wavelength channel 3, and some ONUs 120 work on the wavelength channel 4. In addition, quantities of ONUs 120 on all wavelength channels are basically the same. However, in practical work, the quantities of ONUs 120 on all the wavelength channels may be different due to dynamic online and offline of a user. For example, a relatively large quantity of ONUs 120 may exist on a wavelength channel, and a relatively small quantity of ONUs 120 exist on one or more other wavelength channels and even no wavelength channel is used by the ONU 120, that is, wavelength channel load unbalance may occur. In this case, a wavelength channel used by more ONUs 120 has heavier load. Because ONUs 120 working on a same wavelength channel perform service multiplexing in a TDM manner, a normal service of the ONU 120 may be affected due to insufficient bandwidth when load of one wavelength channel is excessively heavy.

The current industry expects a bandwidth of an ONU to be greater than 10G, and each ONU needs to include at least one wavelength channel. In NG-EPON requirement discussion, some new network structures are proposed, including a single scheduling domain—wavelength division multiplexing PON (SSD-WDM-PON), a wavelength agile PON (WA-PON), and a multiple scheduling domain—wavelength division multiplexing PON (MSD-WDM-PON). In these new network structures, an ONU also needs to include at least one wavelength channel, so as to meet a high-bandwidth requirement of a commercial user.

Figure 3A:
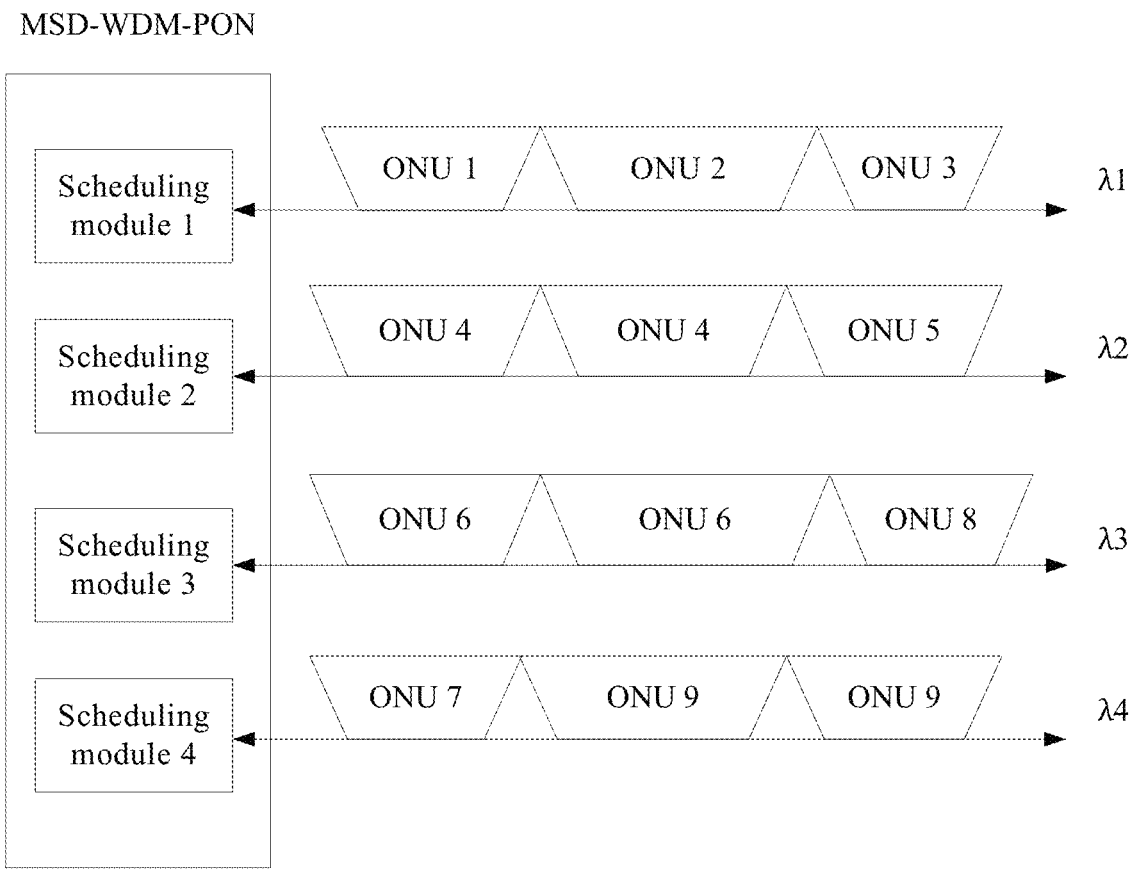
FIG. 3A is a schematic structural diagram of an MSD-WDM-PON network according to an embodiment of the present disclosure.

As shown in FIG. 3A, in a general NG-EPON architecture, an example MSD-WDM-PON system includes four wavelength channels in total. On an OLT side, each wavelength channel corresponds to one independent bandwidth scheduling module, for example, scheduling modules 1 to 4 in an OLT shown in FIG. 3A. Each ONU corresponds to one wavelength channel. ONUs 1 to 3 work on a wavelength channel $\lambda 1$, an ONU 4 and an ONU 5 work on a wavelength channel $\lambda 2$, an ONU 6 and an ONU 8 work on a wavelength channel $\lambda 3$, and an ONU 7 and an ONU 9 work on a wavelength channel $\lambda 4$. FIG. 3A is a working timeslot diagram of an ONU, and each trapezoidal block represents one timeslot. On the wavelength channel $\lambda 1$, the OLT allocates three timeslots with different lengths to the ONUs 1 to 3; on the wavelength channel $\lambda 2$, the OLT allocates more upstream timeslots to the ONU 4. Likewise, on the wavelength channel $\lambda 3$, the OLT allocates more upstream timeslots to the ONU 6; on the wavelength channel $\lambda 4$, the OLT allocates more upstream timeslots to the ONU 9. In this architecture, when a wavelength channel is faulty, the OLT needs to start protection switching, to reallocate a service on the faulty wavelength channel to another wavelength channel. This protection switching process requires cooperation of a plurality of bandwidth scheduling modules and a protection switching module of the OLT. An OLT system is greatly affected, and this causes a relatively slow switching speed.

A symmetric mode (e.g., both an upstream rate and a downstream rate are 10 Gbps) and an asymmetric mode (e.g., a downstream rate is 10 Gbps, and an upstream rate is 1 Gbps) are defined in a current 10G-EPON. As a requirement of a 4 k high-definition video and an enterprise for a high bandwidth increasingly increases, a 10G bandwidth of the current 10G-EPON gradually cannot meet client requirements. Therefore, a requirement for a high-bandwidth NG-EPON is put on the agenda.

Figure 3B:
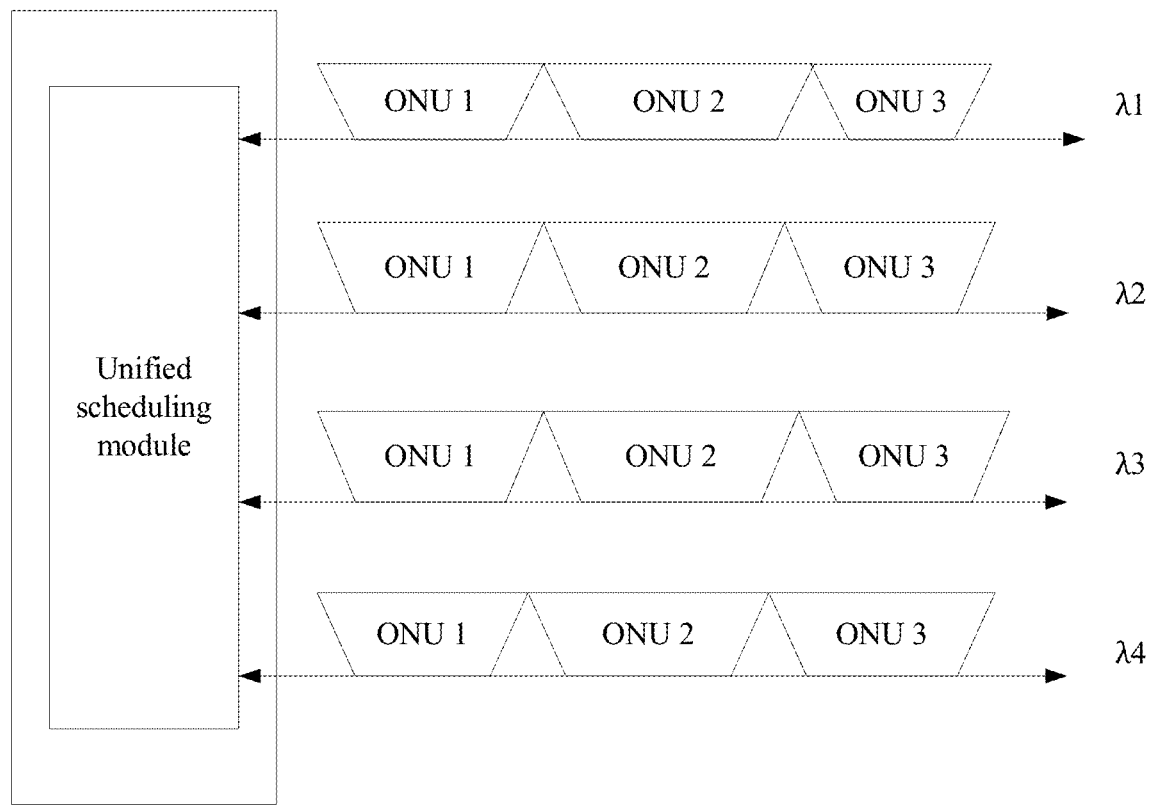
FIG. 3B is a schematic structural diagram of an SSD-WDM-PON network according to an embodiment of the present disclosure.
Figure 3C:
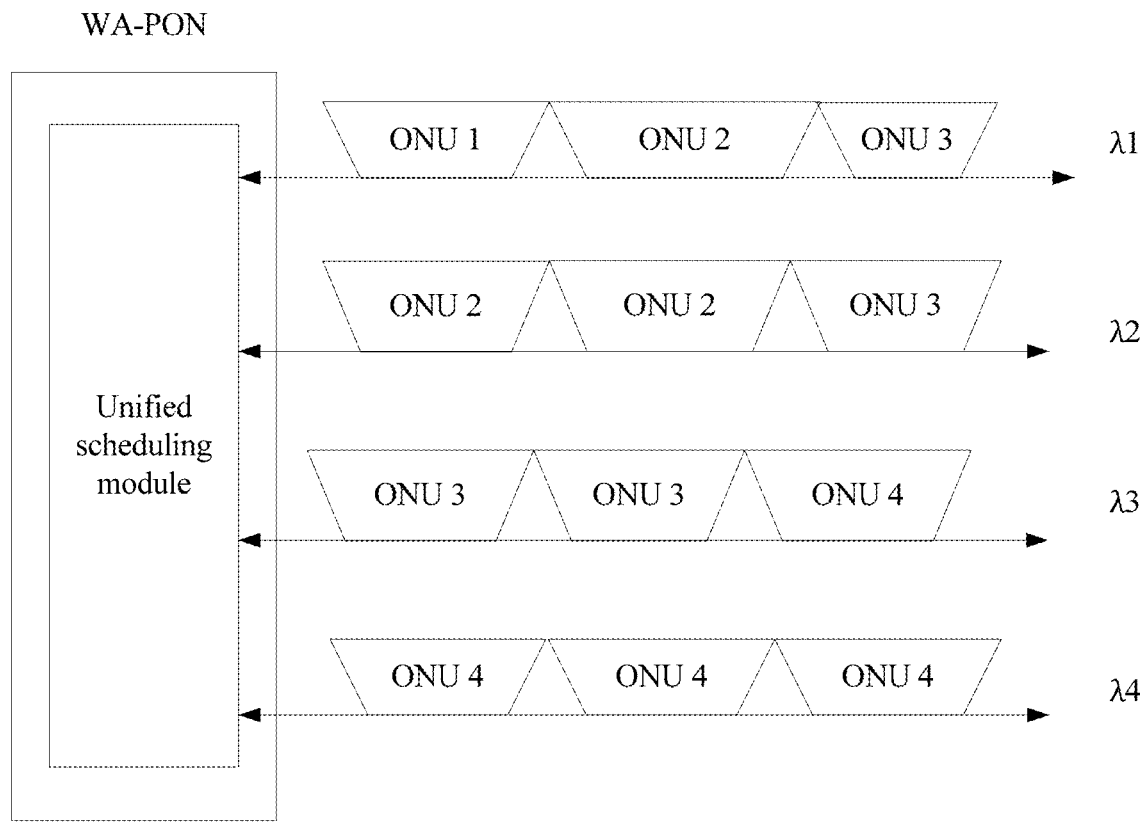
FIG. 3C is a schematic structural diagram of a WA-PON network according to an embodiment of the present disclosure.

As shown in FIG. 3B, to improve a bandwidth of each ONU, a new NG-EPON network architecture (SSM-WDM-PON) is proposed. FIG. 3B may be the same as FIG. 3A, and may be understood as a working timeslot diagram of an ONU. Available wavelength channels of an ONU 1 are $\lambda 1$ to $\lambda 4$, available wavelength channels of an ONU 2 are $\lambda 1$ to $\lambda 4$, and available wavelength channels of an ONU 3 are $\lambda 1$ to $\lambda 4$. On the wavelength channels $\lambda 1$ to $\lambda 4$, an OLT allocates different timeslots (each trapezoidal block represents one timeslot) to the ONU 1 to the ONU 3, and the wavelength channels $\lambda 1$ to $\lambda 4$ work in parallel. In the network architecture, the OLT includes only one unified bandwidth scheduling module. An advantage of this structure is that utilization of an entire bandwidth is higher, and each ONU can obtain a maximum bandwidth. Certainly, in an application scenario, the ONU does not need to enable four wavelength channels, and two or three wavelength channels may be enough. Therefore, a more flexible architecture is defined in the NG-EPON. As shown in FIG. 3C, in yet another network structure (WA-PON), an ONU 1 includes only one wavelength channel $\lambda 1$, an ONU 2 includes two wavelength channels $\lambda 1$ and $\lambda 2$, an ONU 3 includes three wavelength channels $\lambda 1$ to $\lambda 3$, and an ONU 4 includes four wavelength channels $\lambda 1$ to $\lambda 4$. FIG. 3C may be considered as a hybrid structure of FIG. 3A and FIG. 3B. ONUs including different wavelength channels may coexist in a same optical splitter. Therefore, various application scenarios can be met, and the hybrid structure is a most flexible NG-EPON network structure with highest bandwidth utilization and supporting various services.

The following embodiments of the present disclosure are based on the foregoing network structure that an ONU includes a plurality of wavelength channels (including a special case of one wavelength channel). A central idea is that a plurality of physical wavelength channels are bound to a high-bandwidth logical channel (or understood as a wavelength channel group), and mapping between a wavelength channel group and a wavelength channel is established, so as to implement unified higher-bandwidth scheduling and wavelength channel management. For example, the ONU 3 includes three available wavelength channels: C1, C2, and C3. Each wavelength channel includes a wavelength pair: one upstream wavelength and one downstream wavelength. Each wavelength channel corresponds to a 10 Gbps bandwidth. Therefore, in this embodiment of the present disclosure, a logical channel group G1 is established, so that the logical channel group G1 includes the three wavelength channels: C1, C2, and C3 (in practical processing, the logical channel group G1 may include only one wavelength channel, or any two wavelength channels, and does not need to include all available wavelength channels). In this way, on an OLT side, a high bandwidth channel of 30 Gbps is obtained. An advantage of such processing is as follows: It is assumed that a channel C2 is faulty, a scheduling module of the OLT can rapidly and easily reallocate a service to remaining wavelength channels C1 and C3, so that a problem of interaction between three independent bandwidth scheduling modules of 10 Gbps is avoided. Therefore, bandwidth scheduling management efficiency and bandwidth utilization are higher. For specific technical solutions, refer to the following embodiments.

Figure 4:
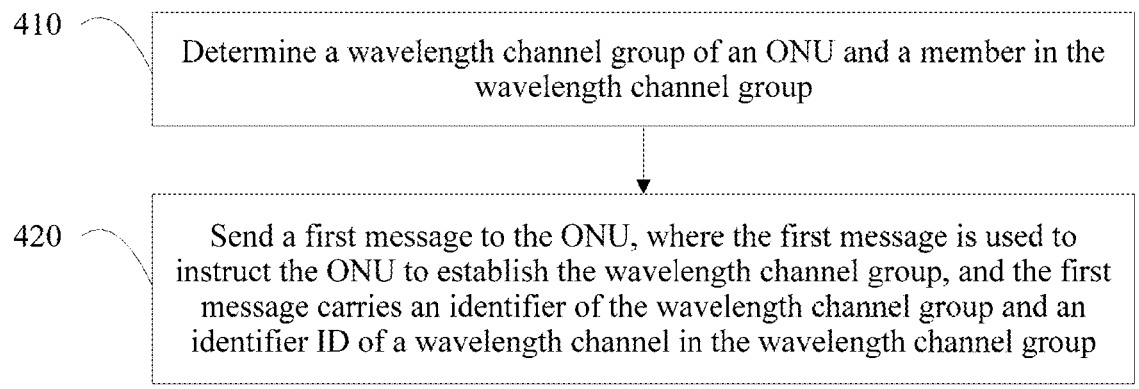
FIG. 4 is a schematic flowchart of a passive optical network communication method according to an embodiment of the present disclosure.

FIG. 4 is a flowchart of a passive optical network communication method 400 according to an embodiment of the present disclosure. As shown in FIG. 4, the method in this embodiment includes the following steps.

Step 410: Determine a wavelength channel group of an ONU and a wavelength channel in the wavelength channel group.

Specifically, an OLT selects or determines the wavelength channel in the wavelength channel group by using a preset rule, and notifies the ONU of identification information of the channel group and identification information of the wavelength channel in the wavelength channel group.

According to the preset rule, the OLT may perform allocation according to factors such as a current load status, a specific algorithm, and a current wavelength channel use status.

Step 420: Send a first message to the ONU, where the first message is used to instruct the ONU to establish the wavelength channel group, and the first message carries identification information of the wavelength channel group and identification information of the wavelength channel in the wavelength channel group.

The first message may be a Multi-Point Control Protocol (MPCP) message, an operation, administration and maintenance (OAM) message, a physical layer operation, administration and maintenance (PLOAM) message, an optical network terminal management and control interface (OMCI) message, or a user-defined message.

It should be noted that the identification information of the wavelength channel group may be an ID or a number for uniquely identifying the wavelength channel group. The identification information of the wavelength channel may be an ID, upstream wavelength information, downstream wavelength information, or wavelength pair information for identifying the wavelength channel of the ONU, or another unique identifier for identifying wavelength channel information.

In a specific implementation, preferably, before step S410, the method further includes the following step:

S430. An OLT sends a request message to the ONU, where the request message is used to request the ONU to report information about a current available wavelength channel.

It should be understood that the information about the current available wavelength channel of the ONU is related to a quantity of optical modules currently inserted into the ONU.

Preferably, the request message may be further used to request the ONU to report information such as a quantity of current available wavelength channels, a maximum quantity of currently supported wavelength channels, or a logical link identifier LLID corresponding to each wavelength channel.

In a specific implementation, for example, an ONU 1 reports, to the OLT, that the ONU 1 has four available wavelength channels in total: wavelength channels λ1 to λ4. The OLT allocates, to the ONU 1 according to a rule (the rule may be set by a maintenance personnel or an engineer of the OLT by using a command line or a console), G #1 whose channel group ID is 1. Members in G #1 are λ1 to λ3, and λ4 is not in the channel group.

Preferably, the method 400 further includes the following step:

S440. The OLT receives the information about the wavelength channel reported by the ONU.

Preferably, the method 400 further includes the following step:

S450. The OLT locally establishes a wavelength channel mapping table, so as to store information about mapping between a wavelength channel group and a wavelength channel. In a specific implementation, the wavelength channel mapping table may be shown in following Table 1:

TABLE 1

| ONU-ID | Maximum quantity of currently supported channels | Quantity of current available channels | Wavelength channel group ID | Wavelength channel ID |
|---|---|---|---|---|
| 1 | 5 | 4 | 1 | λ1 to λ4 |
| 2 | 4 | 3 | 2 | λ1 to λ3 |
| 3 | 4 | 4 | 3 | λ2 to λ4 |
| 4 | 4 | 3 | 4 | λ1 to λ3 |

As shown in Table 1, the OLT is connected to four ONUs (which is merely an example). An ID of a channel group allocated by the OLT to the ONU 1 is 1, and the channel group of the ONU 1 includes wavelength channels λ1 to λ4. An ID of a channel group allocated by the OLT to an ONU 2 is 2, and the channel group of the ONU 2 includes wavelength channels λ1 to λ3. An ID of a channel group allocated by the OLT to an ONU 3 is 3, and the channel group of the ONU 3 includes wavelength channels λ2 to λ4. An ID of a channel group allocated by the OLT to an ONU 4 is 4, and the channel group of the ONU 4 includes wavelength channels λ1 to λ3.

Optionally, the method 400 further includes the following step:

S460. The OLT sends a wavelength channel update message to the ONU, so as to instruct the ONU to update the information about the wavelength channel.

Specifically, the updating operation may be deletion, addition, disabling, hibernation, or re-enabling. If a wavelength channel is stored in the wavelength channel mapping table, deletion, addition, disabling, hibernation, or re-enabling is performed on an entire wavelength channel. If an upstream wavelength and a downstream wavelength are stored in the wavelength channel mapping table, the updating operation may be downstream wavelength deletion, downstream wavelength addition, downstream wavelength disabling, downstream wavelength hibernation, or downstream wavelength enabling; or may be upstream wavelength deletion, upstream wavelength addition, upstream wavelength disabling, upstream wavelength hibernation, or upstream wavelength enabling.

Optionally, the wavelength channel update message may be an OAM message, an MPCP message, a PLOAM message, or an OMCI message.

It should be noted that there may be no member in the wavelength channel group or the wavelength channel group may include one or more members.

In this embodiment of the present disclosure, such a logical channel group as a wavelength channel group is established, and when a channel in a channel group is faulty, a scheduling module of the OLT can reallocate a service to another member in the channel group, so that channel interaction is avoided. Therefore, bandwidth scheduling efficiency and bandwidth utilization of a PON system are higher.

Figure 5:
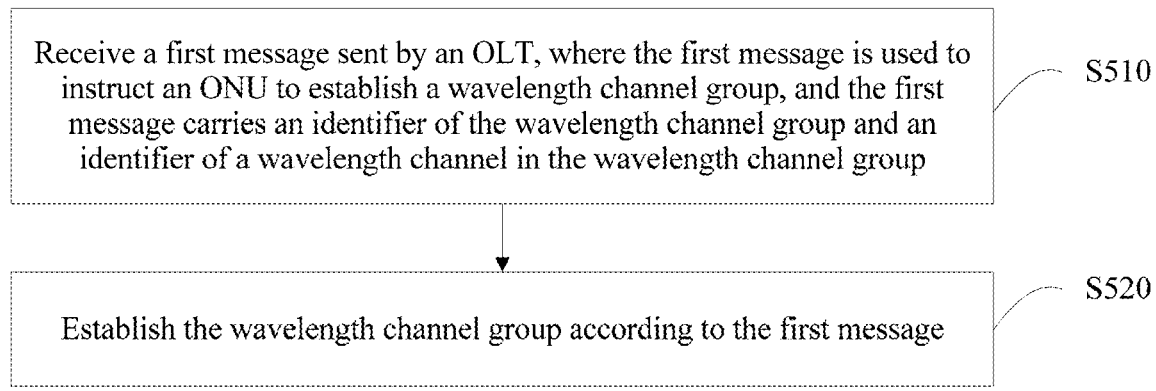
FIG. 5 is a schematic flowchart of a passive optical network communication method according to another embodiment of the present disclosure.

FIG. 5 is a flowchart of a passive optical network communication method 500 according to an embodiment of the present disclosure. As shown in FIG. 5, the method in this embodiment includes the following steps.

Step 510: Receive a first message sent by an OLT, where the first message is used to instruct an ONU to establish a wavelength channel group, and the first message carries an identifier of the wavelength channel group and an identifier of a wavelength channel in the wavelength channel group.

Step 520: Establish the wavelength channel group according to the first message.

Optionally, the first message may be a Multi-Point Control Protocol (MPCP) message, an operation, administration and maintenance (OAM) message, a physical layer operation, administration and maintenance (PLOAM) message, an optical network terminal management and control interface (OMCI) message, or a user-defined message.

Preferably, before step 510, the method 500 further includes the following step:

Step 530: Receive a second message sent by the OLT, where the second message is used to request the ONU to report identification information of a current available wavelength channel.

Specifically, the identification information of the wavelength channel may be a wavelength ID, a wavelength pair ID, upstream wavelength information, downstream wavelength information, or upstream and downstream wavelength information. In the present disclosure, the identifier of the wavelength channel may be defined as information for uniquely identifying the wavelength channel of the ONU, and may be one or more of the foregoing examples.

Optionally, the second message may be further used to request the ONU to report information such as a maximum quantity of currently supported channels, a quantity of current available channels, or a logical link identifier (LLID) corresponding to each channel.

Optionally, the second message may be an MPCP message, an OAM message, a PLOAM message, or an OMCI message.

Preferably, the method 500 further includes the following step:

Step 540: Send a response message of the second message to the OLT, where the response message carries the identifier of the wavelength channel of the ONU.

Correspondingly, the response message of the second message may further carry information such as a maximum quantity of currently supported channels of the ONU, a quantity of current available channels, or a logical link identifier LLID corresponding to each channel.

Preferably, the method 500 further includes the following step:

Step 550: After receiving the first message, the ONU locally establishes a wavelength channel group mapping table in the ONU, where the mapping table is used to record a mapping relationship between a channel group and a member in the channel group. It should be understood that one ONU may include a plurality of logical channel groups.

For example, the following Table 2 is an example of a wavelength channel group mapping table established by the ONU:

TABLE 2

| ONU-ID | Maximum quantity of currently supported channels | Quantity of current available channels | Wavelength channel group ID | Wavelength channel group member ID |
|---|---|---|---|---|
| 1 | 5 | 4 | 1 | λ1 to λ2 |
| 1 | 5 | 4 | 2 | λ3 to λ4 |

As shown in Table 2, the ONU locally includes two wavelength channel groups: an ID 1 and an ID 2. The wavelength channel group 1 includes wavelength channels λ1 and λ2, and the wavelength channel group 2 includes wavelength channels λ3 and λ4.

It should be understood that the establishing the wavelength channel group may be: after receiving the first message, the ONU locally establishes the wavelength channel mapping table, and establishes a mapping relationship between the wavelength channel group and a wavelength channel. When the OLT subsequently allocates a bandwidth to the ONU, the OLT may perform bandwidth allocation by using the wavelength channel group as a whole. For example, in a specific implementation, the OLT allocates a 30M bandwidth to a channel group 1 of an ONU 1, and the 30M bandwidth is allocated in the channel group according to a preset service balance rule. For example, a 10M bandwidth may be allocated to each wavelength channel, or allocation may be performed according to another bandwidth combination, such as 5, 5, and 20.

It should be understood that the response message of the second message may be carried in a PLOAM message, an MPCP message, an OAM message, or an OMCI message.

Preferably, the method 500 further includes the following step:

S560. Update the wavelength channel mapping table.

Specifically, the updating operation may be deletion, addition, disabling, hibernation, or re-enabling. If a wavelength channel is stored in the wavelength channel mapping table, deletion, addition, disabling, hibernation, or re-enabling is performed on an entire wavelength channel. If an upstream wavelength and a downstream wavelength are stored in the wavelength channel mapping table, the updating operation may be downstream wavelength deletion, downstream wavelength addition, downstream wavelength disabling, downstream wavelength hibernation, or downstream wavelength enabling; or may be upstream wavelength deletion, upstream wavelength addition, upstream wavelength disabling, upstream wavelength hibernation, or upstream wavelength enabling.

For example, in a specific implementation, the OLT delivers a wavelength channel update message to the ONU. The wavelength channel update message may be carried in an MPCP message, an OAM message, a PLOAM message, or an OMCI message. The wavelength channel update message may be used to instruct the ONU to add, delete, or modify a wavelength channel. A person of ordinary skills in the art should understand that updating the wavelength channel mapping table is usually initiated by the OLT, or may be voluntarily initiated by the ONU in a special case. For example, updating a channel group status of the ONU may be triggered by means of hardware signal detection; or the ONU sends a wavelength channel update request to the OLT after performing triggering, and the OLT instructs, after performing corresponding processing, the ONU to update the wavelength channel mapping table.

Optionally, an interaction message in a process of updating the wavelength channel mapping table by the OLT may be an OAM message, an MPCP message, a PLOAM message, or an OMCI message.

It should be noted that there may be no member in the wavelength channel group or the wavelength channel group may include one or more members.

In this embodiment of the present disclosure, such a logical channel group as a wavelength channel group is established, so that bandwidth scheduling efficiency and bandwidth utilization of a PON system are higher. For example, when a channel in a channel group is faulty, a scheduling module of the OLT can rapidly and easily reallocate a service to another member in the channel group, so that channel interaction is avoided.

Figure 6:
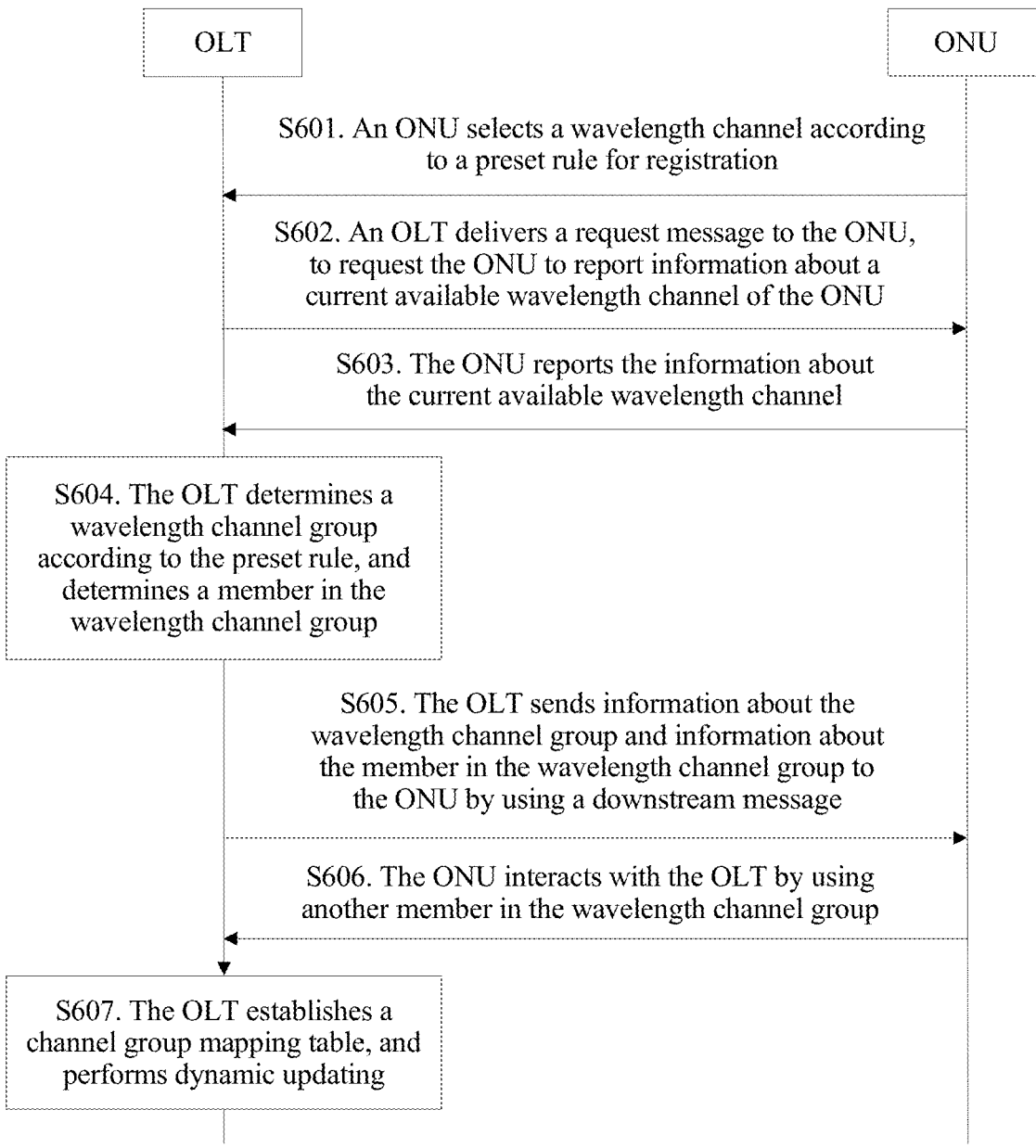
FIG. 6 is a schematic diagram of a passive optical network communication interaction method according to another embodiment of the present disclosure.

The following further describes the present disclosure with reference to a specific application scenario. FIG. 6 is a schematic interaction flowchart of a passive optical network communication method according to an embodiment of the present disclosure. As shown in FIG. 6, the method in this embodiment includes the following steps.

S601. An ONU selects a wavelength channel randomly or according to a preset rule for registration.

Specifically, the ONU may select one of a plurality of available wavelength channels randomly or according to the preset rule for registration, and the registration process is the same as a PON registration process in the prior art. Details are not described herein. In the ONU registration process, another wavelength channel may be temporarily disabled or hibernated, and the ONU succeeds in registration by using the selected wavelength channel.

It should be understood that for an interaction message between the ONU and an OLT in the ONU registration process, refer to a GPON format or an EPON format in the prior art.

S602. An OLT delivers a request message to the ONU, where the request message is used to request the ONU to report identification information of a current available wavelength channel of the ONU.

Specifically, the OLT may add the request message to an MPCP message, an OAM message, a PLOAM message, or an OMCI message.

S603. The ONU reports information about the current available wavelength channel of the ONU.

S604. The OLT determines a wavelength channel group according to the preset rule, and determines a member in the wavelength channel group.

It should be noted that the OLT may determine one or more wavelength channel groups. There may be no member in the wavelength channel group, or the wavelength channel group may include one or more members.

S605. The OLT sends information about the wavelength channel group and information about the member in the wavelength channel group to the ONU by using a downstream message.

For example, in a specific implementation, the OLT notifies, by using an MPCP message, the ONU that an ID of the wavelength channel group of the ONU is 1, and IDs of members in the wavelength channel group are λ1 to λ4.

S606. The ONU registers with the OLT by using another member in the wavelength channel group.

For example, in a specific implementation, the wavelength channel group includes a wavelength channel 1, a wavelength channel 2, and a wavelength channel 3. In step 601, the ONU performs registration by using the wavelength channel 1. Afterward, in step 606, the ONU registers with the OLT by separately using the wavelength channel 2 and the wavelength channel 3. In this way, registration succeeds by using all wavelength channels.

It should be understood that a process of registering with the OLT by using the wavelength channel 2 and the wavelength channel 3 is basically the same as a registration process in step 601.

S607. The OLT establishes a wavelength channel group mapping table.

It should be understood that the OLT may subsequently update the wavelength channel mapping table dynamically. The dynamic updating indicates that the OLT may perform addition, deletion, hibernation, or disabling on a channel group member.

Certainly, the channel mapping table may further include other required information, such as a maximum quantity of currently supported channels of the ONU, a quantity of current available channels of the ONU, a quantity of currently used channels, an LLID corresponding to each wavelength channel, or a MAC address.

A person of ordinary skill in the art should understand that after the wavelength channel group mapping table is set in an OLT device and an ONU device, a data forwarding table also needs to be modified correspondingly, to modify a destination port in an original forwarding table into a virtual port logically corresponding to a channel group.

For ease of understanding the present disclosure, the following describes a message field in each step in detail.

In step 602, the OLT delivers the request message to the ONU, to request the ONU to report the information about the current available wavelength channel. For example, the request message delivered by the OLT is named as a Channel_req message, and a message reported by the ONU is named as a Channel_ack message.

In step 605, the OLT sends the information about the wavelength channel group and the information about the member in the wavelength channel group to the ONU by using the downstream message. The downstream message is named as a CH_Group_ack message, so that the message carries an ID of a channel group of the ONU and an ID of a member in the channel group.

In a specific implementation, when the Channel_req message, the Channel_ack message, and the CH_Group_ack message are carried by using the MPCP protocol, a message format may be as follows:

TABLE 3

| Field name | Occupied bytes |
| --- | --- |
| Destination address | 6 |
| Source address | 6 |
| Length/Type | 6 |
| Operation code | 6 |
| Time stamp | 4 |
| Data/Reserved field | 40 |
| Frame check sequence | 4 |

Table 3 is a frame format in the existing MPCP protocol. The destination address (DA) occupies six bytes, and is used to identify an IP address to which a packet is to be sent.

The source address (SA) occupies six bytes, and is used to identify an IP address from which the packet is sent.

The packet length/type (Length/Type) occupies two bytes, and is used to identify a length and a type of the packet.

The operation code (Opcode) occupies two bytes, and is used to identify a number of a MPCP frame.

The time stamp (Time Stamps) occupies four bytes, and is used to identify a time of sending the packet.

The data/reserved field (Data/Reserved Field) occupies 40 bytes, and is used to carry data information or is used as a reserved field for extended use.

The frame check sequence (FCS) occupies four bytes, and is used to indicate a parity bit.

Five types of MPCP frames are recorded in an existing standard, including a GATE frame, a REPORT frame, a REGISTER_REQ frame, a REGISTER frame, and a REGISTER_ACK frame. All the five types of frames include the foregoing fields, such as the destination address, the source address, the length/type, the operation code, the time stamp, the data/reserved field, and the frame check sequence. Different frame fields have different content. Opcode fields of the five types of frames are 0002, 0003, 0004, 0005, and 0006.

For example, in this embodiment, for the channel_req message format, a field name may be set as channel information (or may be set as another field name) by extending a reserved field in an existing format, so as to request the ONU to report the channel information. A length of the field may be one byte (a field length may be set according to an actual requirement, and one byte is only an example for description), and there are eight bytes in total.

Specifically, the Channel_ack message may be shown in the following Table 4:

TABLE 4

| Field | Length | Field meaning |
| --- | --- | --- |
| DA | 6 bytes | MAC-control multicast address or ONU address |
| SA | 6 bytes | ONU address |
| L/T | 2 bytes | Frame type |
| Opcode | 2 bytes | 0x7: Channel group establishment |

TABLE 4-continued

| Field | Length | Field meaning |
|---|---|---|
| Time stamp | 4 bytes | Moment of sending an MPCP-PDU, that is, a value of a sending time localTime, terminated by only MPCP and invisible to an upper layer |
| ONU ID | 16 bytes | Unique ONU identifier, such as an SN, a MAC, or an LLID |
| Information about an available channel of the ONU | 1 byte | For example, wavelength channel identifiers λ1 to λ4 of the ONU |
| Maximum quantity of channels supported by the ONU | 1 byte | For example, a maximum quantity of channels supported by the ONU is 5, and zero padding is performed on other bits. |
| Quantity of current available channels of the ONU | 1 byte | For example, a quantity of current available channels of the ONU is 4, and zero padding is performed on other bits. |
| Pad | 8 bytes | Perform padding on a remaining part. |
| FCS | 4 bytes | Frame check sequence: generated by a MAC layer |

A format of the CH_Group_ack message may be shown in the following Table 5:

TABLE 5

| Field | Length | Field meaning |
|---|---|---|
| DA | 6 bytes | MAC-control multicast address or ONU address |
| SA | 6 bytes | ONU address |
| L/T | 2 bytes | Frame type |
| Opcode | 2 bytes | 0x7: Channel group establishment |
| Time stamp | 4 bytes | Moment of sending an MPCP-PDU, that is, a value of a sending time localTime, terminated by only MPCP and invisible to an upper layer |
| ONU ID | 16 bytes | Unique ONU identifier, such as an SN, a MAC, or an LLID |
| ONU channel group ID | 1 byte | For example, three bits are used to indicate channel group identifiers #0 to #7, and zero padding is performed on other bits. |
| ONU channel group operation | 1 byte | For example, 0 indicates "delete", 1 indicates "create", 2 indicates "maintain", and other values are reserved. |
| Channel group member ID 1 | 1 byte | For example, this field indicates an identifier of a first wavelength channel joining a channel group of the ONU; or four low-order bits are used to identify a downstream wavelength ID, and four high-order bits are used to identify an upstream wavelength ID. |
| Channel group member ID n (n is 2 to 7) | 1 byte | This field indicates an identifier of an $n^{th}$ wavelength pair joining a channel group of the ONU; or four low-order bits are used to identify a downstream wavelength ID, and four high-order bits are used to identify an upstream wavelength ID. |
| Channel group member ID 8 | 1 byte | This field indicates an identifier of an eighth wavelength pair joining a channel group of the ONU; or four low-order bits are used to identify a downstream wavelength ID, and four high-order bits are used to identify an upstream wavelength ID. |
| Operation of a channel group member ID 1 | 1 byte | Operation performed on a member by using a wavelength: For example, 0 indicates a "delete" operation, 1 indicates an "add" operation, 2 indicates a "disable" operation, 3 indicates a "hibernate" operation, 4 indicates a "re-enable" operation, and other values are reserved. When upstream and downstream wavelengths do not match, four low-order bits are used to identify a downstream wavelength ID, and four high-order bits are used to identify an upstream wavelength ID. |

TABLE 5-continued

| Field | Length | Field meaning |
|---|---|---|
| Operation of a channel group member ID (n n is 2 to 8) | 1 byte | Operation performed on a member by using a wavelength: 0 indicates a "delete" operation, 1 indicates an "add" operation, 2 indicates a "disable" operation, 3 indicates a "hibernate" operation, 4 indicates a "re-enable" operation, and other values are reserved. When upstream and downstream wavelengths do not match, four low-order bits are used to identify a downstream wavelength ID, and four high-order bits are used to identify an upstream wavelength ID. |
| Pad | 8 bytes | Perform padding on a remaining part. |
| FCS | 4 bytes | Frame check sequence: generated by a MAC layer |

It should be understood that the Channel_req message, the Channel_ack message, or the CH_Group_ack message may further carry another field, for example, information such as a quantity of current available channels of the ONU, a maximum quantity of channels supported by the ONU, or an LLID corresponding to each channel. The foregoing fields may be implemented by extending a reserved field in an existing MPCP message. Details are not described herein.

Optionally, after a wavelength channel group mapping table is successfully established by the OLT and the ONU, the OLT and the ONU may update a channel group member or change a working state of a channel group member according to a requirement. The ONU may trigger, by means of hardware signal detection, to update a channel group state, or the ONU performs triggering and sends a wavelength channel group mapping table update request to the OLT, and the OLT updates a channel group of the ONU; or the OLT actively initiates channel group updating of the ONU, and the OLT directly sends the CH_Group_ack message to update a channel group state of the ONU.

In another specific implementation, when the OAM message carries the Channel_req message, the Channel_ack message, and the CH_Group_ack message, a message format may be as follows:

An OAM message format specified in the standard is shown in Table 6:

TABLE 6

| Field | Length | Field meaning |
|---|---|---|
| DA | 6 bytes | Slow_Protocols_Multicast address |
| SA | 6 bytes | OLT or ONU address |
| Length/Type | 2 bytes | This field indicates a frame type, and extended OAM is fixed to a Slow_Protocols_Type domain value. |
| Subtype | 1 byte | This field identifies the encapsulated specific Slow Protocol, and an OAMPDU subtype domain value is 0x03. |
| Flag | 2 bytes | A flag domain includes status bits, such as Link Fault, Dying Gasp, Critical Event, Local Evaluating, Local Stable, Remote Evaluating, and Remote Stable, and a fault detection function is implemented by using the status information. |
| Code | 1 byte | 0xFE |
| Data/PAD | 42 to 1496 bytes | Including an OUI field, an Ext. Opcode field, a payload field, and a pad field |
| FCS | 4 bytes | Frame check sequence: generated by a MAC layer |

A format of the Channel_req message or the Channel_ack message carried by using the OAM protocol may be shown in the following Table 7:

TABLE 7

| Field | Length | Field meaning |
|---|---|---|
| DA | 6 bytes | Slow_Protocols_Multicast address |
| SA | 6 bytes | OLT or ONU address |
| Length/Type | 2 bytes | This field indicates a frame type, and extended OAM is fixed to a Slow_Protocols_Type domain value. |
| Subtype | 1 byte | This field identifies the encapsulated specific Slow Protocol, and an OAMPDU subtype domain value is 0x03. |

TABLE 7-continued

| Field | Length | Field meaning |
|---|---|---|
| Flag | 2 bytes | A flag domain includes status bits, such as Link Fault, Dying Gasp, Critical Event, Local Evaluating, Local Stable, Remote Evaluating, and Remote Stable, and a fault detection function is implemented by using the status information. |
| Code | 1 byte | 0xFE |
| OUI | 3 bytes | Organizationally unique identifier |
| Ext. code | 1 byte | 0x07: The OLT queries wavelength and port information from the ONU. 0x08: The ONU reports the wavelength and port information to the OLT. |
| OAM Number | 2 bytes | Packet sequence number |
| Data length | 2 bytes | Valid data length |
| ONU ID | 16 bytes | Unique ONU identifier |
| ONU-max-Wavelength | 1 byte | Maximum quantity of ports or wavelength pairs supported by the ONU |
| Current-ONU-available wavelength | 1 byte | Quantity of ports or wavelength pairs that can be currently used by the ONU |
| Current-available-channel ID 1 | 1 byte | This field indicates a current available wavelength pair ID; or four low-order bits indicate a downstream wavelength ID, and four high-order bits indicate an upstream wavelength ID. |
| Current-available-channel ID 2 | 1 byte | This field indicates a current available wavelength pair ID; or four low-order bits indicate a downstream wavelength ID, and four high-order bits indicate an upstream wavelength ID. |
| Current-available-channel ID n | 1 byte | This field indicates a current available wavelength pair ID; or four low-order bits indicate a downstream wavelength ID, and four high-order bits indicate an upstream wavelength ID. |
| Current-available-channel ID 8 | 1 byte | This field indicates a current available wavelength pair ID; or four low-order bits indicate a downstream wavelength ID, and four high-order bits indicate an upstream wavelength ID. |
| Pad | | Perform padding on a remaining part. |
| FCS | 4 bytes | Frame check sequence: generated by a MAC layer |

A format of the CH_Group_ack message carried by using the OAM protocol may be shown in the following Table 8:

TABLE 8

| Field | Length | Field meaning |
|---|---|---|
| DA | 6 bytes | Slow_Protocols_Multicast address |
| SA | 6 bytes | OLT or ONU address |
| Length/Type | 2 bytes | This field indicates a frame type, and extended OAM is fixed to a Slow_Protocols_Type domain value. |
| Subtype | 1 byte | This field identifies the encapsulated specific Slow Protocol, and an OAMPDU subtype domain value is 0x03. |
| Flag | 2 bytes | A flag domain includes status bits, such as Link Fault, Dying Gasp, Critical Event, Local Evaluating, Local Stable, Remote Evaluating, and Remote Stable, and a fault detection function is implemented by using the status information. |
| Code | 1 byte | 0xFE |
| OUI | 3 bytes | Organizationally unique identifier |
| Ext. code | 1 byte | 0x09: Channel group establishment |
| OAM Number | 2 bytes | Packet sequence number |
| Data length | 2 bytes | Valid data length |
| ONU ID | 16 bytes | Unique ONU identifier |
| ONU channel group ID | 1 byte | 0x0: Three bits are used to indicate channel group identifiers #0 to #7. |
| ONU channel group operation | 1 byte | 0x0 indicates a "delete" operation, 0x1 indicates a "create" operation, 0x2 indicates a "maintain" operation, and other values are reserved. |
| Channel group member ID 1 | 1 byte | This field indicates an identifier of a first wavelength pair joining a channel group of the ONU; or four low-order bits are used to identify a downstream wavelength ID, and four high-order bits are used to identify an upstream wavelength ID. |

TABLE 8-continued

| Field | Length | Field meaning |
|---|---|---|
| Channel group member ID n (n may be an integer from 2 to 8) | 1 byte | This field indicates an identifier of an $n^{th}$ wavelength pair joining a channel group of the ONU; or four low-order bits are used to identify a downstream wavelength ID, and four high-order bits are used to identify an upstream wavelength ID. |
| Pad | 1 byte | Perform padding on a remaining part. |
| FCS | 4 bytes | Frame check sequence: generated by a MAC layer |

In another specific implementation, when the CH_Group_ack message is carried by using the PLOAM protocol, a format of the CH_Group_ack message may be shown in the following Table 9:

TABLE 9

| Length | Field | Field meaning |
|---|---|---|
| 1-2 | ONU identifier | ONU identifier |
| 3 | Message type | Message type |
| 4 | Sequence number | Sequence number |
| 5-8 | Supplier identifier | Supplier identification information |
| 9-12 | Dedicated sequence number of a supplier | Dedicated sequence number of a supplier |
| 13 | Channel group identifier | Channel group ID |
| 14 | ONU channel group operation | For example, 0 indicates "delete", 1 indicates "add", 2 indicates "maintain", and other values are reserved. |
| 15 | Channel group member ID 1 | This field indicates an identifier of a first wavelength pair joining a channel group of the ONU; or four low-order bits are used to identify a downstream wavelength ID, and four high-order bits are used to identify an upstream wavelength ID. |
| 16-21 | Channel group member ID n | This field indicates an identifier of an $n^{th}$ wavelength pair joining a channel group of the ONU; or four low-order bits are used to identify a downstream wavelength ID, and four high-order bits are used to identify an upstream wavelength ID. |
| 22 | Channel group member ID 8 | This field indicates an identifier of an eighth wavelength pair joining a channel group of the ONU; or four low-order bits are used to identify a downstream wavelength ID, and four high-order bits are used to identify an upstream wavelength ID. |
| 23-40 | Padding | Perform padding on a remaining part. |
| 41-48 | MIC | Message integrity check |

In a specific implementation, when the CH_Group_ack message is carried by using the OMCI protocol, a message format may be shown in the following Table 10:

TABLE 10

| Length | Field | Field meaning |
|---|---|---|
| 1-2 | Transmission identifier | The transaction correlation identifier is used to associate a request message with its response message. |
| 3 | Message type | Message type |
| 4 | Device identifier | In baseline OMCI messages, this field is defined to be 0x0A. In extended OMCI messages, this field is defined to be 0x0B. |
| 5-8 | Management entity identifier | Reference Itu-T G988 |
| 9 | ONU channel group operation | For example, 0 indicates "delete", 1 indicates "create", 2 indicates "maintain", and other values are reserved. |
| 10 | Channel group member ID 1 | This field indicates an identifier of a first wavelength pair joining a channel group of the ONU; or four low-order bits are used to identify a downstream wavelength ID, and four high-order bits are used to identify an upstream wavelength ID. |

TABLE 10-continued

| Length | Field | Field meaning |
|---|---|---|
| 11-16 | Channel group member ID n | This field indicates an identifier of an $n^{th}$ wavelength pair joining a channel group of the ONU; or four low-order bits are used to identify a downstream wavelength ID, and four high-order bits are used to identify an upstream wavelength ID. |
| 17 | Channel group member ID 8 | This field indicates an identifier of an eighth wavelength pair joining a channel group of the ONU; or four low-order bits are used to identify a downstream wavelength ID, and four high-order bits are used to identify an upstream wavelength ID. |
| 18-40 | Reserved field | Reserved field |
| 41-48 | OMCI trailer | |

It should be understood that a person of ordinary skill in the art can obtain the present disclosure on a basis of fully understanding each message format and by extending a reserved field. Details are not described herein.

It should be understood that in various embodiments of the present disclosure, sequence numbers of the foregoing processes do not mean execution sequences. The execution sequences of the processes should be determined according to functions and internal logic of the processes, and should not be construed as any limitation on the implementation processes of the embodiments of the present disclosure.

In this embodiment of the present disclosure, such a logical channel group as a wavelength channel group is established, so that bandwidth scheduling efficiency and bandwidth utilization of a PON system are higher. For example, when a channel in a channel group is faulty, a scheduling module of the OLT can rapidly and easily reallocate a service to another member in the channel group, so that channel interaction is avoided.

Figure 7:
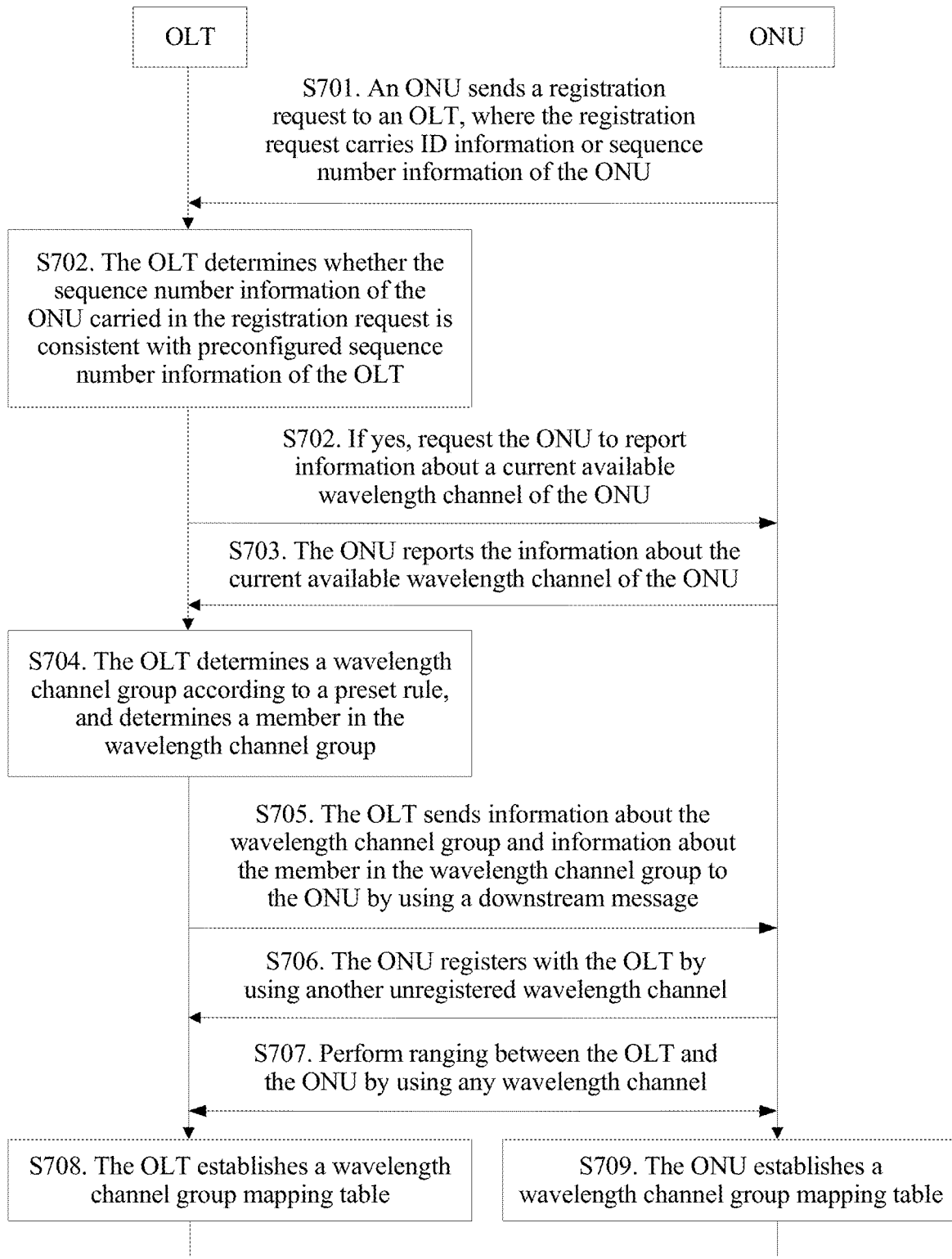
FIG. 7 is a schematic diagram of a passive optical network communication interaction method according to another embodiment of the present disclosure.

The following further describes the present disclosure with reference to another application scenario. FIG. 7 is an interaction flowchart of establishing a channel group according to an embodiment of the present disclosure. As shown in FIG. 7, the method in this embodiment of the present disclosure includes the following steps.

S701. An ONU sends a registration request to an OLT, where the registration request carries ID information or sequence number information of the ONU.

It should be understood that the ONU includes at least one available wavelength channel, and the ONU may send a registration request message by using any wavelength channel.

S702. The OLT determines whether the sequence number information of the ONU carried in the registration request is consistent with preconfigured sequence number information of the OLT, and if the sequence number information of the ONU carried in the registration request is consistent with the preconfigured sequence number information of the OLT, requests the ONU to report information about a current available wavelength channel of the ONU.

S703. The ONU reports the information about the available wavelength channel of the ONU.

S704. The OLT determines a wavelength channel group according to a preset rule, and determines a member in the wavelength channel group.

S705. The OLT sends information about the wavelength channel group and information about the member in the wavelength channel group to the ONU by using a downstream message.

S706. The ONU registers with the OLT by using another unregistered wavelength channel.

S707. Perform ranging between the OLT and the ONU by using any wavelength channel.

S708. The OLT establishes a wavelength channel group mapping table.

S709. The ONU establishes a wavelength channel group mapping table.

It should be understood that an interaction message format in this embodiment of the present disclosure may be consistent with that in Embodiment 3. Details are not described herein again.

It should be understood that a person of ordinary skill in the art can obtain the present disclosure on a basis of fully understanding each message format and by extending a reserved field. Details are not described herein.

It should be understood that in various embodiments of the present disclosure, sequence numbers of the foregoing processes do not mean execution sequences. The execution sequences of the processes should be determined according to functions and internal logic of the processes, and should not be construed as any limitation on the implementation processes of the embodiments of the present disclosure.

In this embodiment of the present disclosure, such a logical channel group as a wavelength channel group is established, so that bandwidth scheduling efficiency and bandwidth utilization of a PON system are higher. For example, when a channel in a channel group is faulty, a scheduling module of the OLT can rapidly and easily reallocate a service to another member in the channel group, so that channel interaction is avoided.

Figure 8:
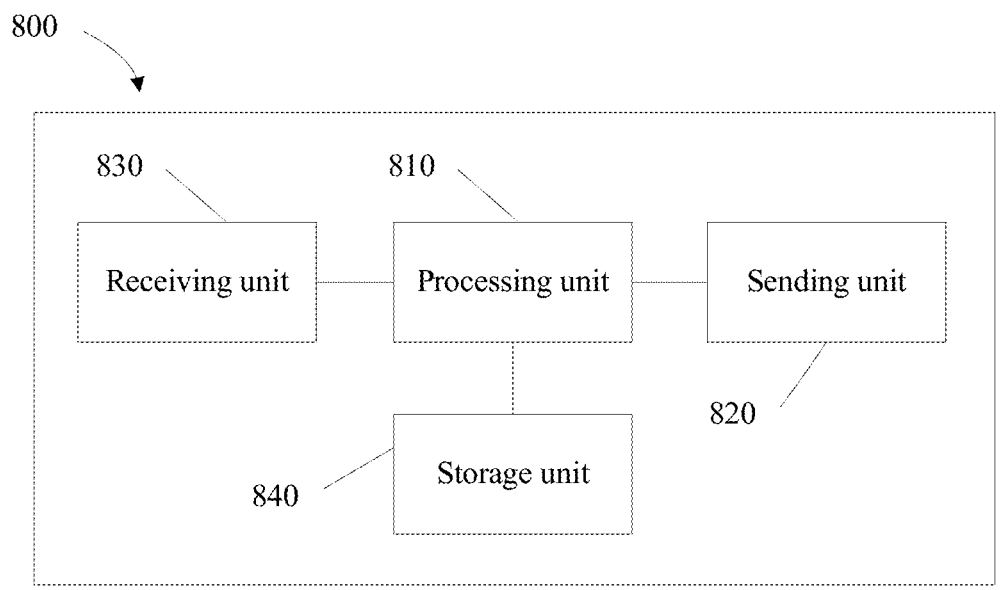
FIG. 8 is a schematic structural diagram of an optical line terminal according to an embodiment of the present disclosure.

FIG. 8 is a schematic structural diagram of a passive optical network communications apparatus according to an embodiment of the present disclosure. As shown in FIG. 8, a passive optical network communications apparatus 800 provided in this embodiment includes a processing unit 810 and a sending unit 820.

The processing unit 810 is configured to determine a wavelength channel group of an ONU and a member in the wavelength channel group.

Specifically, the processing unit 810 of an OLT selects or determines an identifier of the wavelength channel group allocated to the ONU and the member in the channel group by using a preset rule, and notifies the ONU of the identifier of the channel group and identification information of the member in the channel group.

The sending unit 820 is configured to send a first message to the ONU, where the first message is used to instruct the ONU to establish the wavelength channel group, and the first message carries an identifier ID of the wavelength channel group and an identifier ID of the wavelength channel in the wavelength channel group.

The first message is a Multi-Point Control Protocol MPCP message, an operation, administration and maintenance OAM message, an optical network terminal management and control interface OMCI message, or a physical layer operation, administration and maintenance PLOAM message.

In a specific implementation, preferably, the sending unit 820 is further configured to:

send a request message to the ONU, where the request message is used to request the ONU to report identification information of a current available wavelength channel.

Specifically, the identification information of the wavelength channel may be the ID of the wavelength channel of the ONU, upstream wavelength information of the ONU, downstream wavelength information of the ONU, upstream and downstream wavelength information, or another identifier for uniquely identifying the wavelength channel of the ONU.

In a specific implementation, for example, an ONU 1 reports, to the OLT, that the ONU 1 has four current available wavelength channels: a wavelength channel 1, a wavelength channel 2, a wavelength channel 3, and a wavelength channel 4. The ONU may identify the four wavelength channels by using wavelength information. For example, an upstream wavelength of the wavelength channel 1 is 1300 nm (nm), and a downstream wavelength of the wavelength channel 1 is 1600 nm. The ONU may report identification information of the wavelength channels to the OLT.

The OLT sets one channel group G #1 according to a preset rule (the rule may be set by a maintenance personnel or an engineer of the OLT by using a command line or a console), and G #1 includes the wavelength channel 1, the wavelength channel 2, and the wavelength channel 3.

Preferably, the apparatus 800 further includes:

a receiving unit 830, configured to receive the identification information of the wavelength channel reported by the ONU.

Preferably, the apparatus 800 further includes:

a storage unit 840, where the storage unit is configured to store a wavelength channel mapping table generated by the OLT, and the wavelength channel mapping table is used to store information about the wavelength channel group and information about the wavelength channel.

Optionally, the processing unit 810 is further configured to update the wavelength channel mapping table. The updating may be entry addition, entry deletion, entry modification, or another operation performed on an entry.

It should be understood that the wavelength channel group may have no or one member.

Preferably, the receiving unit 830 is further configured to receive a third message sent by the ONU, where the third message is reported by using the wavelength channel in the wavelength channel group of the ONU.

Preferably, the sending unit 820 is further configured to send a response message of the third message to the ONU, and the response message and the third message interact with the ONU by using a same wavelength channel.

It should be further understood that the passive optical network communications apparatus in this embodiment is configured to execute the technical solutions on an OLT side in FIG. 4, FIG. 6, and FIG. 7. An implementation principle and a technical effect of this embodiment are similar to those of the technical solutions, and description of Embodiment 1, Embodiment 3, or Embodiment 4 is also applicable to this embodiment of the present disclosure. Details are not described herein again.

In this embodiment of the present disclosure, such a logical channel group as a wavelength channel group is established, so that bandwidth scheduling efficiency and bandwidth utilization of a PON system are higher. For example, when a channel in a channel group is faulty, a scheduling module of the OLT can rapidly and easily reallocate a service to another member in the channel group, so that channel interaction is avoided.

Figure 9:
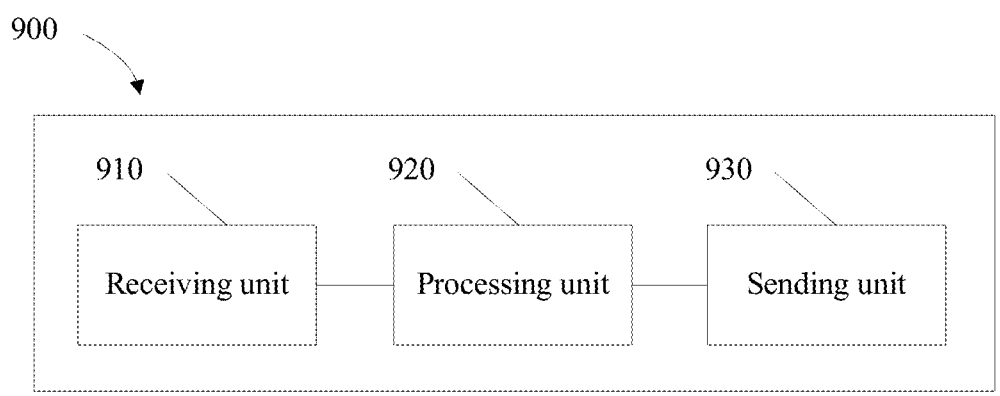
FIG. 9 is a schematic structural diagram of an optical network unit according to an embodiment of the present disclosure.

FIG. 9 is a schematic structural diagram of a passive optical network communications apparatus according to an embodiment of the present disclosure. As shown in FIG. 9, a passive optical network communications apparatus 900 provided in this embodiment includes a receiving unit 910 and a processing unit 920.

The receiving unit 910 is configured to receive a first message sent by an OLT, where the first message is used to instruct an ONU to establish a wavelength channel group, and the first message carries an identifier of the wavelength channel group and an identifier of a wavelength channel in the wavelength channel group.

Optionally, after receiving the first message, the receiving unit 910 of the ONU locally establishes a wavelength channel group mapping table in the ONU, and the mapping table is used to record a mapping relationship between a channel group and a member in the channel group. It should be understood that one ONU may include a plurality of logical channel groups.

The processing unit 920 establishes the wavelength channel group according to the first message.

Preferably, the receiving unit 910 of the ONU is further configured to receive a second message sent by the OLT, where the second message is used to request the ONU to report the identifier of the wavelength channel.

Specifically, the identifier of the wavelength channel may be a wavelength ID, a wavelength pair identifier ID, upstream wavelength information, downstream wavelength information, or upstream and downstream wavelength information. In the present disclosure, the identifier of the wavelength channel may be defined as information for uniquely identifying the wavelength channel of the ONU, and may be one or more of the foregoing examples.

Preferably, the ONU 900 further includes a sending unit 930. The sending unit 930 is configured to send a third message to the OLT, and the third message carries identification information of the wavelength channel.

Preferably, the processing unit 920 may be further configured to update the wavelength channel group.

It should be understood that, specifically, the identifier of the wavelength channel may be a wavelength ID, a wavelength pair identifier ID, upstream wavelength information, downstream wavelength information, or upstream and downstream wavelength information. In the present disclosure, the identifier of the wavelength channel may be defined as information for uniquely identifying the wavelength channel of the ONU, and may be one or more of the foregoing examples.

It should be further understood that the passive optical network communications apparatus in this embodiment is configured to execute the technical solutions on an ONU side in FIG. 5 to FIG. 7. An implementation principle and a technical effect of this embodiment are similar to those of the technical solutions, and description of Embodiment 1, Embodiment 3, or Embodiment 4 is also applicable to this embodiment of the present disclosure. Details are not described herein again.

In this embodiment of the present disclosure, such a logical channel group as a wavelength channel group is established, so that bandwidth scheduling efficiency and bandwidth utilization of a PON system are higher. For example, when a channel in a channel group is faulty, a scheduling module of the OLT can rapidly and easily reallocate a service to another member in the channel group, so that channel interaction is avoided.

Figure 10:
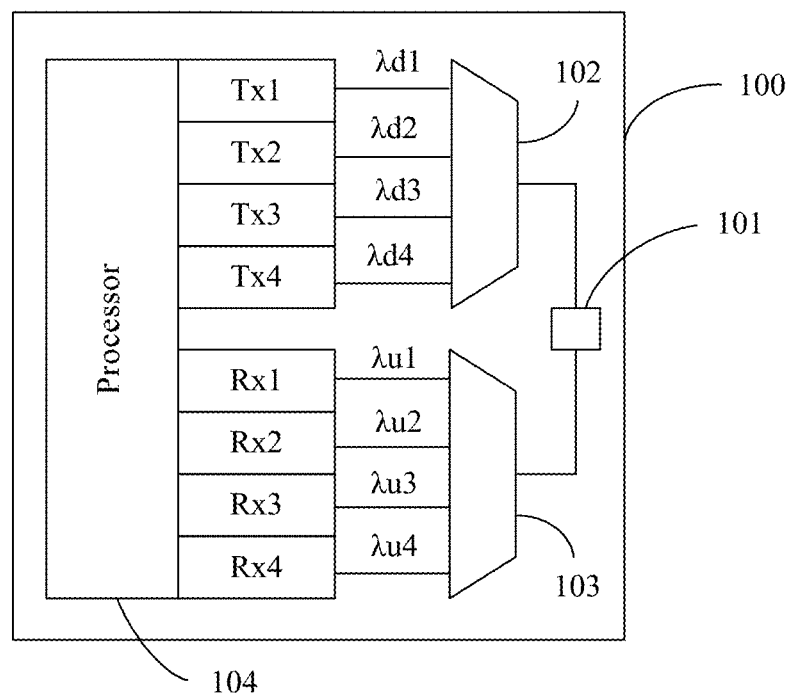
FIG. 10 is a schematic structural diagram of an optical line terminal according to another embodiment of the present disclosure.

An embodiment of the present disclosure further discloses an optical line terminal. FIG. 10 is a schematic structural diagram of an OLT 100 according to an embodiment of the present disclosure. As shown in FIG. 10, the OLT provided in this embodiment includes an optical coupler 101, a first wavelength division multiplexer 102, a second wavelength division multiplexer 103, a plurality of downstream optical transmitters Tx1 to Tx4, a plurality of upstream optical receivers Rx1 to Rx4, and a processor 104. The optical coupler 101, the first wavelength division multiplexer 102, the second wavelength division multiplexer 103, the plurality of downstream optical transmitters Tx1 to Tx4, and the plurality of upstream optical receivers Rx1 to Rx4 are similar to corresponding modules in the OLT 110 shown in FIG. 2. The processor 104 may be configured to execute the method on an OLT side in FIG. 4, FIG. 6, and FIG. 7.

Figure 11:
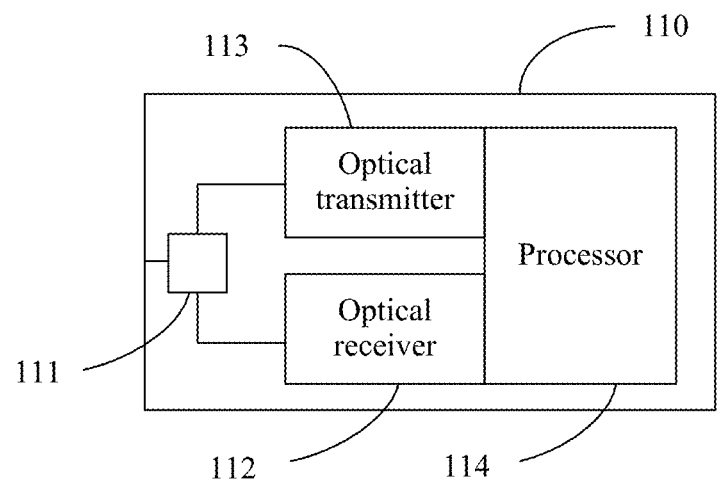
FIG. 11 is a schematic structural diagram of an optical network unit according to another embodiment of the present disclosure.

An embodiment of the present disclosure further discloses an optical network unit. FIG. 11 is a schematic structural diagram of an ONU according to an embodiment of the present disclosure. As shown in FIG. 11, the ONU provided in this embodiment includes an optical coupler 111, a downstream optical receiver 112, an upstream optical transmitter 113, and a processor 114. The optical coupler 111, the downstream optical receiver 112, and the upstream optical transmitter 113 are similar to corresponding modules in the ONU 120 shown in FIG. 2. The processor 114 may be configured to execute the method on an ONU side in FIG. 5 to FIG. 7.

An embodiment of the present disclosure further discloses a passive optical network system, including an OLT and an ONU. The OLT is connected to at least one ONU by using an ODN, the OLT is the OLT shown in FIG. 10, and the ONU is the ONU shown in FIG. 11.

In this embodiment of the present disclosure, only a G/E-PON and a 10G-PON are used as an example for description, but this is not limited. As a network evolves, a single-channel 40G-PON and a single-channel 100G-PON may exist in the network, and the technical solutions in the present disclosure may also be used to implement a plurality of protocols and coexistence of ONUs with a plurality of rates. Details are not described herein.

A person of ordinary skill in the art may understand that, each aspect of the present disclosure or a possible implementation of each aspect may be specifically implemented as a system, a method, or a computer program product. Therefore, each aspect of the present disclosure or a possible implementation of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation of each aspect may take a form of a computer program product, where the computer program product is computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may be actually executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof. Therefore, the protection scope of the present disclosure shall be subject to the protection scope of the claims.

What is claimed is:

1. A passive optical network (PON) communication method, comprising:
    determining a wavelength channel group of an optical network unit (ONU) comprising a plurality of wavelength channels and a wavelength channel of the plurality of wavelength channels in the wavelength channel group, each ONU in communication with a same optical line terminal (OLT) being associated with a respective different wavelength channel group, wherein at least two wavelength channels in the wavelength channel group of the ONU are usable by the ONU in parallel, wherein at least one wavelength channel is comprised in a plurality of wavelength channel groups and is shared by the respective plurality of ONUs in communication with the same OLT, and wherein the plurality of ONUs that share the at least one wavelength channel are allocated different timeslots on the shared at least one wavelength channel to enable the sharing;

sending a first message to the ONU for instructing the ONU to establish the wavelength channel group, wherein the first message carries identification information of the wavelength channel group and identification information of the wavelength channel in the wavelength channel group;

determining that the wavelength channel in the wavelength channel group is faulty; and reallocating a service of the wavelength channel to another wavelength channel in the wavelength channel group of the ONU in response to determining that the wavelength channel in the wavelength channel group is faulty.

2. The method according to claim 1, wherein before determining the wavelength channel group of the ONU and the wavelength channel in the wavelength channel group, the method further comprises:

sending a second message to the ONU for requesting the ONU to report an identifier of the wavelength channel.

3. The method according to claim 1, further comprising:
receiving a third message from the ONU, wherein the third message carries the identifier of the wavelength channel reported by the ONU.

4. The method according to claim 1, further comprising:
locally establishing, by the OLT, a wavelength channel group mapping table; and
storing, in the mapping table, a mapping relationship between the wavelength channel group of the ONU and the plurality of wavelength channels in the wavelength channel group.

5. The method according to claim 1, further comprising:
sending a fourth message to the ONU for instructing the ONU to update information about the wavelength channel group.

6. The method according to claim 1, wherein the first message further carries an identifier of the ONU.

7. The method according to claim 1, wherein the identification information of the wavelength channel comprises at least one of a wavelength channel number of the ONU, upstream wavelength information of the ONU, downstream wavelength information of the ONU, or upstream and downstream wavelength information of the ONU.

8. The method according to claim 1, wherein the first message is a Multi-Point Control Protocol (MPCP) message, a physical layer operation, administration and maintenance (PLOAM) message, an operation, administration and maintenance (OAM) message, or an optical network terminal management and control interface (OMCI) message.

9. An optical line terminal (OLT), comprising:
a processor, configured to determine a wavelength channel group of an optical network unit (ONU) comprising a plurality of wavelength channels and a wavelength channel of the plurality of wavelength channels in the wavelength channel group, each ONU in communication with the OLT being associated with a respective different wavelength channel group, wherein at least two wavelength channels in the wavelength channel group of the ONU are usable by the ONU in parallel, wherein at least one wavelength channel is compromised in a plurality of wavelength channel groups and is shared by the respective plurality of ONUs in communication with the OLT, and wherein the plurality of ONUs that share the at least one wavelength channel are allocated different timeslots on the shared at least one wavelength channel to enable the sharing;

an optical transmitter, configured to send a first message to the ONU for instructing the ONU to establish the wavelength channel group, wherein the first message carries identification information of the wavelength channel group and identification information of the wavelength channel in the wavelength channel group; and wherein the processor is further configured to:
determine that the wavelength channel in the wavelength channel group is faulty, and
reallocate a service of the wavelength channel to another wavelength channel in the wavelength channel group of the ONU in response to determining that the wavelength channel in the wavelength channel group is faulty.

10. The OLT according to claim 9, wherein the optical transmitter is further configured to:
send a second message to the ONU for requesting the ONU to report an identifier of the wavelength channel.

11. The OLT according to claim 9, further comprising:
a receiver, configured to receive a third message from the ONU, wherein the third message carries the identifier of the wavelength channel reported by the ONU.

12. A passive optical network (PON) communication method, comprising:
receiving a first message from an optical line terminal (OLT), wherein the first message is used to instruct an optical network unit (ONU) to establish a wavelength channel group comprising a plurality of wavelength channels, wherein the first message carries an identifier of the wavelength channel group of the ONU and an identifier of a wavelength channel of the plurality of wavelength channels in the wavelength channel group, each ONU in communication with the OLT being associated with a respective different wavelength channel group, wherein at least two wavelength channels in the wavelength channel group of the ONU are usable by the ONU in parallel, wherein at least one wavelength channel is comprised in a plurality of wavelength channel groups and is shared by the respective plurality of ONUs in communication with the OLT, and wherein the plurality of ONUs that share the at least one wavelength channel are allocated different timeslots on the shared at least one wavelength channel to enable the sharing;

establishing the wavelength channel group according to the first message;

receiving an indication that the wavelength channel in the wavelength channel group is faulty; and receiving an indication that a service of the wavelength channel is being reallocated to another wavelength channel in the wavelength channel group of the ONU in response to determining that the wavelength channel in the wavelength channel group is faulty.

13. The method according to claim 12, further comprising:
receiving a second message from the OLT, wherein the second message is used to request the ONU to report the identifier of the wavelength channel.

14. The method according to claim 12, further comprising:
sending the identifier of the wavelength channel of the ONU to the OLT.

15. The method according to claim 12, further comprising:

establishing, by the ONU, a wavelength channel group mapping table; and storing, in the mapping table a mapping relationship between the wavelength channel group of the ONU and the plurality of wavelength channels in the wavelength channel group.

16. The method according to claim 12, wherein the first message further carries an identifier of the ONU.

17. The method according to claim 12, wherein the identification information of the wavelength channel comprises at least one of a wavelength channel number of the ONU, upstream wavelength information of the ONU, downstream wavelength information of the ONU, or upstream and downstream wavelength information of the ONU.

18. The method according to claim 12, wherein the first message is a Multi-Point Control Protocol (MPCP) message, an operation, administration and maintenance (OAM) message, a physical layer operation, administration and maintenance (PLOAM) message, or an optical network terminal management and control interface (OMCI) message.

19. An optical network unit (ONU), comprising:
an optical receiver, configured to receive a first message from an optical line terminal (OLT), wherein the first message is used to instruct the ONU to establish a wavelength channel group comprising a plurality of wavelength channels, wherein the first message carries an identifier of the wavelength channel group of the ONU and an identifier of a wavelength channel of the plurality of wavelength channels in the wavelength channel group, each ONU in communication with the OLT being associated with a respective different wavelength channel group, wherein at least two wavelength channels in the wavelength channel group of the ONU are usable by the ONU in parallel, wherein at least one wavelength channel is comprised in a plurality of wavelength channel groups and is shared by the respective plurality of ONUs in communication with the OLT, and wherein the plurality of ONUs that share the at least one wavelength channel are allocated different time slots on the share at least one wavelength channel to enable the sharing;

a processor, configured to establish the wavelength channel group according to the first message; and wherein the receiver is further configured to:
receive an indication that the wavelength channel in the wavelength channel group is faulty, and
receive an indication that a service of the wavelength channel is being reallocated to another wavelength channel in the wavelength channel group of the ONU in response to determining that the wavelength channel in the wavelength channel group is faulty.

20. The ONU according to claim 19, wherein the optical receiver is further configured to:
receive a second message from the OLT, wherein the second message is used to request the ONU to report the identifier of the wavelength channel.

* * * * *

UNITED STATES PATENT AND TRADEMARK OFFICE
CERTIFICATE OF CORRECTION

PATENT NO. : 10,652,635 B2
APPLICATION NO. : 15/914655
DATED : May 12, 2020
INVENTOR(S) : Jianhe Gao et al.

Page 1 of 1

It is certified that error appears in the above-identified patent and that said Letters Patent is hereby corrected as shown below:

In the Claims

In Claim 9, Column 31, Line 63-64, replace "compromised" with --comprised--.

In Claim 19, Column 34, Line 11, replace "share" with --shared--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*